(12) United States Patent
Nozawa

(10) Patent No.: US 8,981,281 B2
(45) Date of Patent: Mar. 17, 2015

(54) OPTICAL MODULE AND OPTICAL MEASUREMENT DEVICE

(75) Inventor: Takeshi Nozawa, Suwa (JP)

(73) Assignee: Seiko Epson Corporation (JP)

( * ) Notice: Subject to any disclaimer, the term of this patent is extended or adjusted under 35 U.S.C. 154(b) by 805 days.

(21) Appl. No.: 13/287,307

(22) Filed: Nov. 2, 2011

(65) Prior Publication Data

US 2012/0133947 A1      May 31, 2012

(30) Foreign Application Priority Data

Nov. 25, 2010   (JP) ................................ 2010-262186

(51) Int. Cl.
G02B 26/00 (2006.01)
G02B 5/28 (2006.01)
(52) U.S. Cl.
CPC .................................... G02B 26/001 (2013.01)
USPC ........... 250/226; 250/238; 356/454; 356/519; 359/260; 359/578
(58) Field of Classification Search
USPC .......... 250/238, 226, 216; 356/416, 419, 450, 356/451, 454, 402, 519; 359/259, 260, 237, 359/238, 240, 245, 577, 578, 579
See application file for complete search history.

(56) References Cited

U.S. PATENT DOCUMENTS

| | | | | |
|---|---|---|---|---|
| 4,439,038 A | * | 3/1984 | Mactaggart | .................... 356/408 |
| 6,075,595 A | * | 6/2000 | Malinen | ......................... 356/328 |
| 6,563,968 B2 | * | 5/2003 | Davis et al. | ...................... 385/12 |
| 6,833,957 B2 | * | 12/2004 | Sato | ............................... 359/579 |
| 6,954,294 B2 | * | 10/2005 | Sato | ............................... 359/588 |
| 6,985,216 B2 | * | 1/2006 | Treado et al. | .................... 356/73 |
| 6,985,281 B2 | * | 1/2006 | Wagner et al. | ................ 359/315 |
| 7,002,697 B2 | | 2/2006 | Domash et al. | |
| 7,027,470 B2 | * | 4/2006 | May | ............................... 372/20 |
| 7,049,004 B2 | | 5/2006 | Domash et al. | |
| 7,139,295 B2 | * | 11/2006 | Tsai et al. | ........................ 372/20 |
| 7,286,244 B2 | * | 10/2007 | Murata | ......................... 356/519 |
| 7,378,655 B2 | * | 5/2008 | Tai et al. | ..................... 250/338.1 |
| 7,460,567 B2 | * | 12/2008 | May | ............................... 372/18 |
| 7,463,121 B2 | * | 12/2008 | D'Ostilio | ...................... 333/223 |
| 7,626,239 B2 | | 12/2009 | Moy et al. | |
| 7,720,328 B2 | * | 5/2010 | Yan et al. | ......................... 385/14 |

(Continued)

FOREIGN PATENT DOCUMENTS

| | | |
|---|---|---|
| JP | 06-148692 | 5/1994 |
| JP | 10-221661 | 8/1998 |

(Continued)

*Primary Examiner* — John Lee
(74) *Attorney, Agent, or Firm* — Harness, Dickey & Pierce, P.L.C.

(57) ABSTRACT

An optical module comprising a tunable interference filter including a first substrate, a second substrate facing the first substrate, a first reflective film formed on the first substrate, a second reflective film formed on the second substrate and facing the first reflective film, a gap changing unit changing a gap between the first reflective film and the second reflective film, and a driving electrode line electrically connected to the gap changing unit, a temperature sensor detecting temperature of the tunable interference filter and including a first sensor wiring and a second sensor wiring, the first sensor wiring being electrically connected to the driving electrode line, a switch electrically connected to the second sensor wiring, and a temperature detecting circuit electrically connected to the switch.

9 Claims, 11 Drawing Sheets

(56) References Cited

U.S. PATENT DOCUMENTS

| | | | |
|---|---|---|---|
| 7,734,131 B2* | 6/2010 | Lin et al. | 385/27 |
| 7,795,586 B2* | 9/2010 | Krummel et al. | 250/339.1 |
| 8,194,252 B2* | 6/2012 | Yasuda | 356/454 |
| 8,497,990 B2* | 7/2013 | Nozawa | 356/419 |
| 8,593,723 B2* | 11/2013 | Kitahara et al. | 359/337.2 |
| 8,792,101 B2* | 7/2014 | Nozawa | 356/454 |
| 8,817,268 B2* | 8/2014 | Sano et al. | 356/454 |
| 2002/0041611 A1* | 4/2002 | May | 372/29.02 |
| 2002/0043616 A1* | 4/2002 | May | 250/226 |
| 2002/0071626 A1* | 6/2002 | Davis et al. | 385/12 |
| 2002/0097760 A1* | 7/2002 | May | 372/18 |
| 2003/0048970 A1* | 3/2003 | Cole et al. | 385/1 |
| 2003/0087121 A1 | 5/2003 | Domash et al. | |
| 2004/0008438 A1* | 1/2004 | Sato | 359/890 |
| 2004/0066810 A1* | 4/2004 | May | 372/32 |
| 2005/0094964 A1* | 5/2005 | Sato | 385/147 |
| 2005/0134962 A1* | 6/2005 | Verghese | 359/579 |
| 2005/0152015 A1 | 7/2005 | Anderson et al. | |
| 2005/0270548 A1* | 12/2005 | Komiya et al. | 358/1.9 |
| 2007/0241843 A1* | 10/2007 | D'Ostilio | 333/229 |
| 2007/0242358 A1* | 10/2007 | Lin et al. | 359/578 |
| 2007/0242920 A1* | 10/2007 | Lin et al. | 385/27 |
| 2012/0013905 A1* | 1/2012 | Nozawa | 356/326 |
| 2012/0133947 A1* | 5/2012 | Nozawa | 356/450 |
| 2012/0194821 A1* | 8/2012 | Nozawa | 356/451 |
| 2013/0107260 A1* | 5/2013 | Nozawa | 356/402 |
| 2013/0128338 A1* | 5/2013 | Lin et al. | 359/291 |
| 2013/0278933 A1* | 10/2013 | Nozawa | 356/419 |
| 2014/0285895 A1* | 9/2014 | Saito et al. | 359/578 |

FOREIGN PATENT DOCUMENTS

| | | |
|---|---|---|
| JP | 10-221669 | 8/1998 |
| JP | 2000-269895 | 9/2000 |
| JP | 2004-537750 | 12/2004 |
| JP | 2006-511828 | 4/2006 |
| JP | 2007-518138 | 7/2007 |
| JP | 2009-251105 | 10/2009 |

* cited by examiner

OPTICAL MODULE AND OPTICAL MEASUREMENT DEVICE

BACKGROUND

1. Technical Field

The present invention relates to an optical module that includes a tunable interference filter extracting light of a predetermined wavelength from incident light and an optical measurement device including the optical module.

2. Related Art

Generally, an interference filter is known in which one pair of reflective films face each other, and light of a predetermined wavelength out of incident light that is strengthened through multiple interferences of the one pair of reflective films is transmitted or reflected (for example, see JP-A-2009-251105).

In the optical filter device (interference filter) disclosed in JP-A-2009-251105, one pair of substrates face each other, and, in one substrate of the substrates, a movable portion (first portion) and a diaphragm (second portion) that holds the movable portion so as to advance toward or retreat from the other substrate are disposed. In addition, one reflective film out of one pair of reflective films (mirrors) is formed in the movable portion, and, in the other substrate, the other reflective film facing the reflective film formed in the movable portion is formed. In this optical filter device, by controlling a voltage applied to an electrostatic actuator disposed between one pair of substrates, the movable portion is displaced by an electrostatic attractive force, and thereby the gap between the one pair of reflective films can be changed.

However, in the above-described interference filter, there is a case where the diaphragm bends due to a change in the ambient temperature. In contrast to this, a system is known that controls the driving of an MEMS device in accordance with a change in the temperature (for example, JP-T-2007-518138).

In the system disclosed in JP-T-2007-518138, a temperature sensor is disposed in the MEMS device, a driving voltage is selected from a lookup table based on a signal transmitted from the temperature sensor, and the selected driving voltage is input to a voltage adding circuit.

However, in JP-T-2007-518138 described above, since the temperature sensor is disposed in the MEMS device, in a case where the temperature sensor is disposed in the interference filter, the wiring of the temperature sensor becomes complicated, whereby the number of wirings is increased. Particularly, in a case where the temperature sensor is disposed in a small-size interference filter, there are problems in that it is difficult to acquire a position at which a connection terminal of the wiring of the temperature sensor is disposed or the layout of the wirings, and the wiring configuration becomes complicated. In addition, in a case where the interference filter is mounted in the optical module, in addition to a filter driving circuit such as the electrostatic actuator, a driving circuit of the temperature sensor needs to be arranged, whereby the wiring configuration of the optical module becomes complicated.

SUMMARY

An advantage of some aspects of the invention is that it provides an optical module and an optical measurement device of which the wiring configuration can be simplified even in a case where the temperature sensor is disposed in the interference filter.

A first aspect of the invention is directed to an optical module including: a tunable interference filter including a first substrate, a second substrate that faces the first substrate, a first reflective film that is disposed on the first substrate, a second reflective film that is disposed on the second substrate and faces the first reflective film through a gap, a gap changing unit that changes a size of the gap by being applied with a voltage, a driving electrode line that is electrically connected to the gap changing unit, and a temperature sensor that detects temperature of the tunable interference filter and has a first sensor wiring and a second sensor wiring; and a filter driving circuit unit including a driving circuit that is connected to the driving electrode line and applies voltages to the gap changing unit and the temperature sensor and a temperature detecting circuit, which is connected to the second sensor wiring, to which a temperature detection signal output from the temperature sensor is input. The first sensor wiring is connected to the driving electrode line.

According to the above-described optical module, the first sensor wiring out of the one pair of sensor wirings of the temperature sensor is connected to the driving electrode line that is used for applying a voltage to the gap changing unit. Accordingly, a driving voltage can be applied to the temperature sensor through the driving electrode line. In such a configuration, the wiring configuration can be simplified more than a case where, for example, a temperature sensor driving terminal portion is disposed, and a voltage is applied to the temperature sensor from the sensor driving terminal portion.

In addition, in a configuration in which the sensor driving terminal portion is disposed in the tunable interference filter, also in the filter driving circuit unit, a wiring connected to the sensor driving terminal portion is arranged, and a sensor voltage source that is used for applying a driving voltage to the sensor driving terminal portion needs to be additionally arranged. In contrast to this, according to the above-described optical module, a configuration is employed in which a driving voltage source used for applying a voltage to the gap changing unit and the driving electrode line are connected, and the sensor voltage source or a wiring configuration for connecting the sensor voltage source and the sensor driving terminal portion to each other is unnecessary. Accordingly, the wiring configuration in the filter driving circuit unit can be simplified, whereby the configuration can be simplified.

As above, since the wiring configurations of the tunable interference filter and the filter driving circuit unit can be simplified, the entire wiring configuration of the optical module can be simplified, and thereby reducing the manufacturing cost.

In the above-described optical module, it is preferable that the gap changing unit is an electrostatic actuator that includes a first electrode disposed on the first substrate and a second electrode disposed on the second substrate and faces the first electrode through an inter-electrode gap, the second electrode includes a first partial electrode and a second partial electrode, the driving electrode line includes a first driving electrode line that is connected to the first partial electrode and a second driving electrode line that is connected to the second partial electrode, the first sensor wiring is connected to the first driving electrode line, the second sensor wiring is connected to the second driving electrode line, and the filter driving circuit unit includes: a first driving circuit that connects the first driving voltage source and the first driving electrode line to each other and applies a voltage to the first partial electrode or the temperature sensor; and a second driving circuit that has a first switch performing switching between a first switching status in which the second driving voltage source and the second driving electrode line are connected, and a voltage is applied to the second partial electrode and a second switching status in which the temperature detecting circuit and the second driving electrode line are connected, and the temperature detection signal output from the temperature sensor to which a voltage is applied by the first driving voltage source is output to the temperature detecting circuit.

The tunable interference filter may have a configuration in which an electrostatic actuator is used as the gap changing unit, and the size of the gap between the first reflective film and the second reflective film is further changed by an electrostatic attractive force. In such a case, by dividing one electrode (second electrode) out of the first and second electrodes configuring the electrostatic actuator into two or more partial electrodes, the size of the gap can be controlled with high precision.

Here, in the above-described optical module, out of the partial electrodes configuring the second electrode, the first sensor wiring is connected to the first driving electrode line of the first partial electrode, and the second sensor wiring is connected to the second driving electrode line of the second partial electrode. Accordingly, even in a case where a plurality of the partial electrodes is disposed in the tunable interference filter, a special terminal does not need to be arranged for connecting the sensor wiring of the temperature sensor to the control circuit unit, and the configuration can be simplified.

In addition, in the filter driving circuit unit, the first driving circuit connected to the first driving terminal portion and the second driving circuit connected to the second driving terminal portion are disposed. In the second of these driving circuits, the first switch that switches between the first switching status and the second switching status is disposed. In such a configuration, the wiring configuration is not complicated, and by employing a simple wiring configuration in which only switching of the switch needs to be performed, switching between the driving of the temperature sensor and the driving of the gap changing unit can be performed in an easy manner.

In the above-described optical module, it is preferable that the temperature sensor is a thermistor or a metal resistance temperature detector of which a resistance value changes in accordance with a change in the temperature.

In such a case, the thermistor or the metal resistance temperature detector of which a resistance value changes in accordance with a change in the temperature is used. Accordingly, by detecting a current flowing through the temperature detecting unit, the resistance value of the temperature sensor is calculated based on the voltage applied to the temperature sensor in an easy manner, and the temperature corresponding to the resistance value can be detected.

In the above-described optical module, it is preferable that a voltage divider that is grounded through a load resistor is disposed between the temperature sensor and the temperature detecting circuit.

In such a case, in the above-described temperature sensor, the electric potential of the second sensor wiring side is zero, and a voltage value output from the first driving circuit is applied to the temperature sensor. Accordingly, an electric potential difference can be formed in the temperature sensor in an easy manner, and therefore the temperature of the tunable interference filter can be detected with high precision by employing a simple wiring configuration.

In the above-described optical module, the gap changing unit may include a first electrode and a second electrode to which the driving electrode line is connected, wherein the tunable interference filter includes: a reference electrode line that is connected to the first electrode; and a voltage divider that connects the second sensor wiring and the reference electrode line through a load resistor, and wherein the filter driving circuit unit includes a grounded circuit that grounds the reference electrode line.

In a case where the voltage divider is disposed near the temperature detecting circuit of the filter driving circuit unit, there is a case where the voltage (electric potential difference) applied to the temperature sensor cannot be set to a desired voltage value output from the driving circuit due to wiring resistance formed from the temperature sensor to the temperature detecting circuit or the like.

In contrast to this, in the above-described optical module, the first electrode of the tunable interference filter includes the reference terminal portion that is connected to the reference electric potential portion, and, a voltage divider is disposed which connects the other sensor wiring connected to the temperature detecting unit out of one pair of sensor wirings and the reference terminal portion through a load resistor. In such a case, since the voltage divider is disposed in the tunable interference filter, the electric resistance of the sensor wiring becomes extremely small, and accordingly, the voltage applied to the temperature sensor can be set to a desired voltage value applied from the driving circuit. Accordingly, the temperature of the tunable interference filter can be detected with higher precision.

Another aspect of the invention is directed to an optical measurement device including: the above-described optical module; and a control unit that controls the voltage applied to the gap changing unit. The control unit includes: a temperature acquiring section that acquires the temperature detected by the temperature sensor; a voltage calculating section that calculates a voltage to be applied to the gap changing unit that is necessary for transmitting light of a target wavelength from the tunable interference filter based on the temperature acquired by the temperature acquiring section; and a voltage control section that applies the voltage calculated by the voltage calculating section to the gap changing unit by controlling the driving circuit.

According to the above-described optical measurement device, as described above, the wiring configuration of the optical module can be simplified, and the cost relating to the manufacturing thereof can be reduced. Accordingly, the manufacturing cost of the optical measurement device including the optical module can be reduced.

In addition, since accurate temperature of the tunable interference filter can be measured by the temperature sensor in the temperature detecting process, in the light intensity detecting process, an accurate voltage for transmitting light of a target wavelength from the tunable interference filter can be calculated based on the temperature. Accordingly, light of a desired wavelength can be accurately transmitted from the tunable interference filter.

In the above-described optical measurement device, it is preferable that the gap changing unit is an electrostatic actuator that includes a first electrode disposed on the first substrate and a second electrode disposed on the second substrate and faces the first electrode through an inter-electrode gap, the second electrode includes a first partial electrode and a second partial electrode, the driving electrode line includes a first driving electrode line that is connected to the first partial electrode and a second driving electrode line that is connected to the second partial electrode, the first sensor wiring is connected to the first driving electrode line, the second sensor wiring is connected to the second driving electrode line, the filter driving circuit unit includes: a first driving circuit that connects the first driving voltage source and the first driving electrode line to each other and applies a voltage to the first partial electrode or the temperature sensor; and a second driving circuit that has a first switch performing switching between a first switching status in which the second driving voltage source and the second driving electrode line are connected, and a voltage is applied to the second partial electrode and a second switching status in which the temperature detecting circuit and the second driving electrode line are connected, and the temperature detection signal output from the temperature sensor to which a voltage is applied by the first driving voltage source is output to the temperature detecting circuit, and the control unit includes a process switching section that switches between the first switching status and the second switching status by controlling the first switch.

In such a case, the gap changing unit of the tunable interference filter is the electrostatic actuator that includes the first electrode and the second electrode, and the second electrode is divided into the first partial electrode and the second partial electrode so as to be connected to the first driving electrode line and the second driving electrode line. In addition, the first sensor wiring of the temperature sensor is connected to the first driving electrode line, and the second sensor wiring is connected to the second driving electrode line. Furthermore, in the filter driving circuit unit, the second driving circuit connected to the second driving electrode line includes the first switch that switches between the first switching status and the second switching status. The process switching section of the control unit switches the switch to the first switching status in the light intensity detecting process and switches the switch to the second switching status in the temperature detecting process.

In such a configuration, similarly to the above-described optical module, by employing a simple wiring configuration in which only switching status of the first switch needs to be performed, switching between the driving of the temperature sensor and the driving of the gap changing unit can be performed in an easy manner.

In the above-described optical measurement device, it is preferable that the optical module includes a detection unit that receives transmission light transmitted through the tunable interference filter and detects a light intensity of the received light, the filter driving circuit unit includes a second switch that switches between a third switching status in which the detection unit and the control unit are connected and a fourth switching status in which the temperature detecting circuit and the control unit are connected, and the process switching section switches the second switch to the third switching status when the first switch is switched to the first switching status, and the process switching section switches the second switch to the fourth switching status when the first switch is switched to the second switching status.

In such a case, by only changing the statuses of the first switch and the second switch by using the process switching section, switching between a state in which a detection signal transmitted from the detection unit is input to the control unit and a state in which a temperature detection signal detected by the temperature detecting circuit is input to the control unit can be performed in an easy manner. Accordingly, the wiring configuration of the optical measurement device can be further simplified.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.
1. Entire Configuration of Optical Measurement Device FIG. 1 is a system configuration diagram showing a schematic configuration of an optical measurement device 1 according to an embodiment of the invention.

Figure 1:
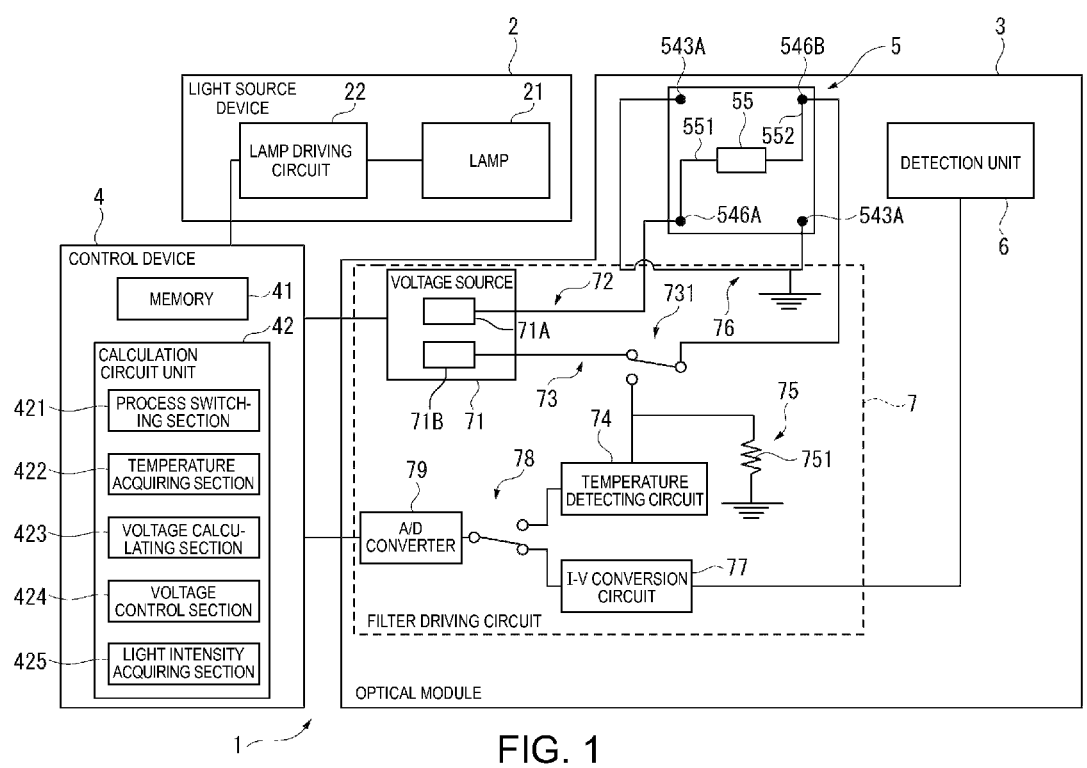
FIG. 1 is a system configuration diagram showing a schematic configuration of an optical measurement device according to an embodiment of the invention.

The optical measurement device 1, as shown in FIG. 1, includes a light source device 2, an optical module 3, and a control device 4. This optical measurement device 1 is a device that measures an optical characteristic such as chromaticity of a measurement target.

More specifically, the optical measurement device 1 allows the light source device 2 to emit light. The light emitted from the light source device 2 is reflected by the measurement target not shown in the figure, and the reflected light is incident to the optical module 3. This optical module 3 includes a tunable interference filter 5 and a detection unit 6, and the tunable interference filter 5 transmits only light of a predetermined target wavelength out of the incident light. Then, light transmitted through the tunable interference filter 5 is received by the detection unit 6, and a light intensity detection signal according to light intensity of the received light is input to the control device 4. Then, in the control device 4, the light intensity of the measurement target for each wavelength is analyzed, and the optical characteristic is measured based on the light intensity detection signal.
2. Configuration of Light Source Device The light source device 2, as shown in FIG. 1, includes a lamp 21 and a lamp driving circuit 22. The lamp 21 can be selected in accordance with an optical characteristic desired to be measured. Thus, in a case where the chromaticity of the measurement target is measured, a white light source is preferably used.

The lamp driving circuit 22 is connected to the control device 4 and changes the driving of lamp 21 or the light intensity (amount of light) of light emitted from the lamp 21 under the control of the control device 4.

In addition, a configuration may be employed in which the light source device 2 includes a plurality of lenses, and light emitted from the lamp 21 is emitted through the plurality of lenses.

3. Configuration of Optical Module

The optical module 3 includes a tunable interference filter 5, a detection unit 6, and a filter driving circuit unit 7. In addition, in the optical module 3, an incident optical system that guides the light reflected by the measurement target to the tunable interference filter 5 may be disposed. In such a case, it is preferable that a collimating lens that allows incident light to be vertically incident to an etalon or a telecentric optical lens system that allows principal rays of the incident light to be vertically incident to the tunable interference filter 5 is used as the incident optical system.

3-1. Configuration of Tunable Interference Filter

Figure 2:
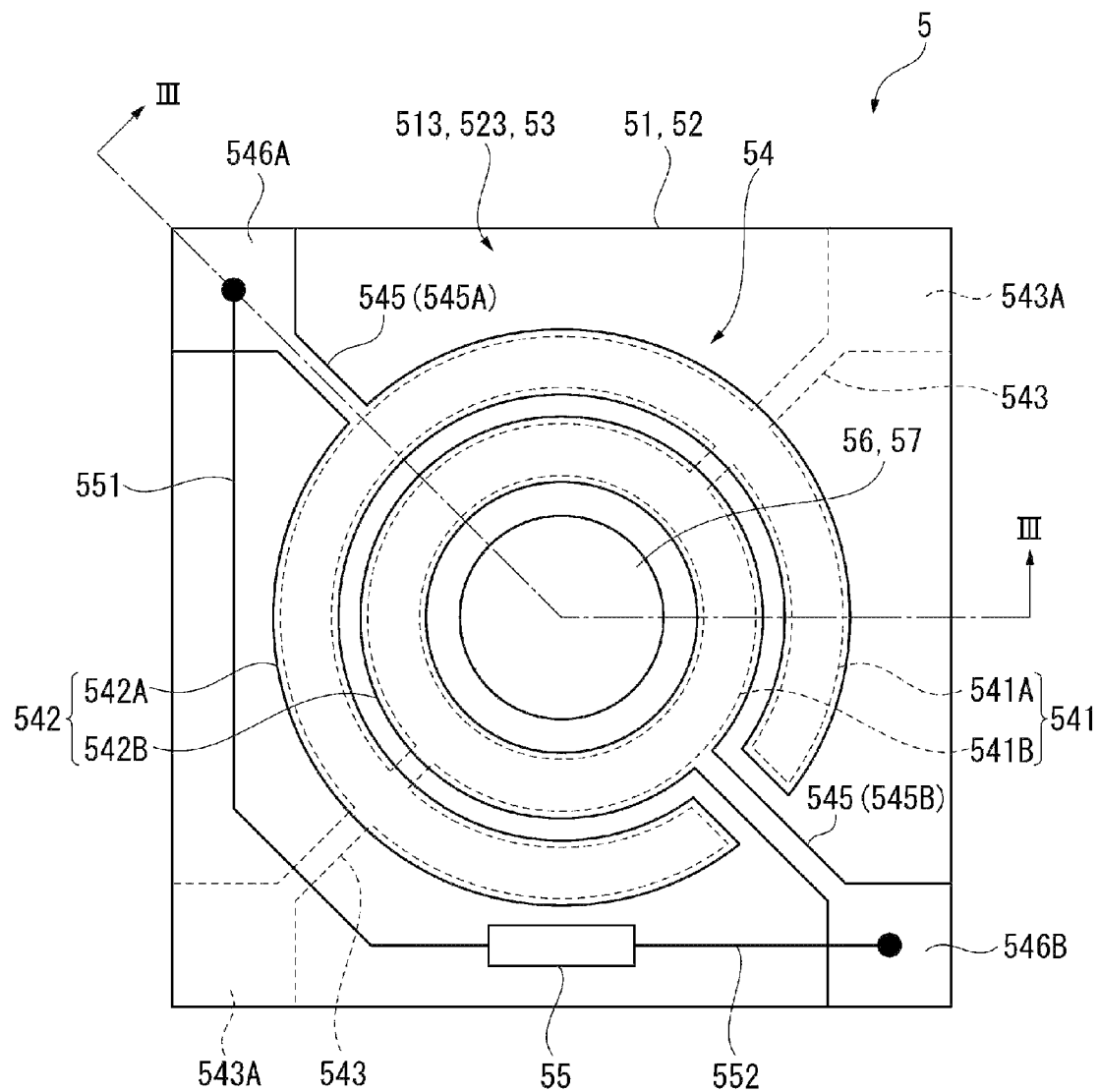
FIG. 2 is a plan view showing a schematic configuration of a tunable interference filter according to a first embodiment.

FIG. 2 is a plan view showing a schematic plane configuration of a tunable interference filter according to this embodiment.

Figure 3:
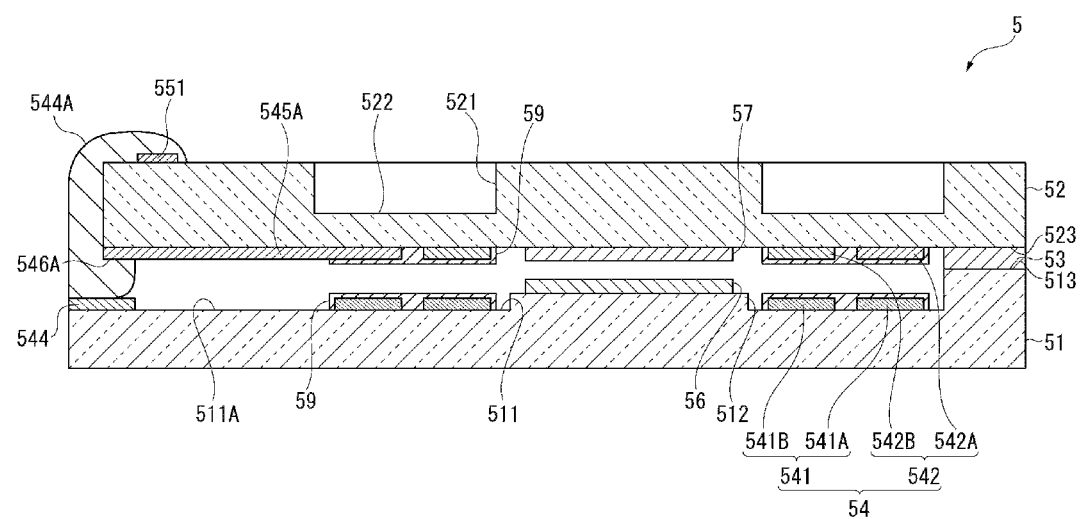
FIG. 3 is a cross-sectional view taken along line III to III shown in FIG. 2.

FIG. 3 is a cross-sectional view taken along line III to III shown in FIG. 2.

The tunable interference filter 5, as shown in FIGS. 2 and 3, includes a fixed substrate 51 (configuring a first substrate according to the embodiment of the invention) and a movable substrate 52 (configuring a second substrate according to the embodiment of the invention). The two substrates 51 and 52, for example, formed from a material that can transmit light of a visible light region including various kinds of glass such as soda glass, crystalline glass, quartz glass, lead glass, potassium glass, borosilicate glass, and non-akali glass, crystal, or the like. The above-described two substrates 51 and 52 are integrally configured by bonding bonding faces 513 and 523 thereof formed along the outer circumference, for example, by using a plasma polymerized film 53, for example, formed from siloxane as its principal component.

In addition, between the fixed substrate 51 and the movable substrate 52, a fixed reflective film 56 (configuring a first reflective film according to the embodiment of the invention) and a movable reflective film 57 (configuring a second reflective film according to the embodiment of the invention) are disposed. Here, the fixed reflective film 56 is fixed to a face of the fixed substrate 51 that faces the movable substrate 52, and the movable reflective film 57 is fixed to a face of the movable substrate 52 that faces the fixed substrate 51. In addition, the fixed reflective film 56 and the movable reflective film 57 are arranged so as to face each other through a gap.

In addition, between the fixed substrate 51 and the movable substrate 52, an electrostatic actuator 54 is disposed which is used for adjusting the size of an inter-reflective film gap between the fixed reflective film 56 and the movable reflective film 57 and configures a gap changing unit according to the embodiment of the invention. This electrostatic actuator 54 is configured by a fixing electrode 541 (configuring a first electrode according to the embodiment of the invention) disposed in the fixed substrate 51 and a movable electrode 542 (configuring a second electrode according to the embodiment of the invention) disposed in the movable substrate and has parts thereof face each other through an inter-electrode gap.

In addition, a temperature sensor 55 is disposed on a face of the movable substrate 52 that does not face the fixed substrate 51.

3-1-1. Configuration of Fixed Substrate

An electrode groove 511 and a mirror fixing portion 512 are formed through etching on a face of the fixed substrate 51 that faces the movable substrate 52.

The electrode groove 511, although not shown in FIG. 2, in the plan view of the filter acquired by viewing the fixed substrate 51 from the direction of the substrate thickness, is formed in a ring shape having a planar center point as its center.

The mirror fixing portion 512 is formed in a cylinder shape protruding toward the movable substrate 52 on the same axis as that of the electrode groove 511.

In addition, in the fixed substrate 51, a wiring groove 511A (see FIG. 3) is formed which extends from the electrode groove 511 toward each vertex of the fixed substrate 51 and has the same depth size as that of the electrode groove 511.

In the bottom face of the electrode groove 511, a ring-shaped fixing electrode 541 that configures the electrostatic actuator 54 is formed. This fixing electrode 541 is formed by a conductive film formed from Cr/Au or the like.

This fixing electrode 541, as shown in FIGS. 2 and 3, includes an outer fixing electrode 541A and an inner fixing electrode 541B. In this embodiment, the inner fixing electrode 541B is formed in a ring shape, and the outer fixing electrode 541A is formed in a "C" shape in correspondence with an outer movable electrode 542A to be described later. However, the outer fixing electrode 541A may be formed in a ring shape as well.

In addition, the fixing electrode 541 is covered with an insulating film 59, and accordingly, discharge between the movable electrode 542 and the fixing electrode 541 and the like are prevented.

As shown in FIG. 2, the outer fixing electrode 541A and the inner fixing electrode 541B are connected to each other through a common electrode line 543 (configuring a reference electrode line according to the embodiment of the invention) that is arranged along a diagonal line of the fixed substrate 51 (for example, a diagonal line formed from the lower left side toward the upper right side in FIG. 2). In addition, in tip end portions of the common electrode line 543, that is, a lower left vertex and an upper right vertex of the fixed substrate 51 shown in FIG. 2, common electrode terminal portions 543A that connect the common electrode line 543 and the filter driving circuit unit 7 is disposed.

In addition, out of four vertexes of the fixed substrate 51, in portions (an upper left vertex and a lower right vertex shown in FIG. 2) facing an outer driving terminal portion 546A and an inner driving terminal portion 546B, as shown in FIG. 3, opposing electrodes 544 are disposed. The opposing electrode 544 and the outer driving terminal portion 546A or the inner driving terminal portion 546B facing the opposing electrode 544 are electrically connected to each other through an Ag paste 544A.

To a face of the mirror fixing portion 512 that faces the movable substrate 52, the fixed reflective film 56 is fixed. This fixed reflective film 56 may be a dielectric multi-layer film that is configured, for example, by laminating $SiO_2$ and $TiO_2$ or may be configured by a metal film formed from an Ag alloy or the like. Furthermore, the fixed reflective film 56 may be configured by laminating both a dielectric multi-layer film and a metal film.

To the outside of the electrode groove 511 in the fixed substrate 51, a first bonding face 513 is formed. On the first bonding face 513, as described above, the plasma polymerized film 53 that bonds the fixed substrate 51 and the movable substrate 52 together is formed.

3-1-2. Configuration of Movable Substrate

The movable substrate 52 is formed by processing a face that does not face the fixed substrate 51 through etching. This movable substrate 52 includes a movable portion 521 having a cylinder shape that has a center point of the substrate as its center and a holding portion 522, of which the axis is the same as that of the movable portion 521, holding the movable portion 521. Here, the size of the outer circumferential diameter of the holding portion 522 is formed to be the same as that of the outer circumferential diameter of the electrode groove 511 of the fixed substrate 51.

The four vertexes of the movable substrate 52 are partly notched, and, in the plan view acquired by viewing the tunable interference filter 5 from the movable substrate 52 side, parts of the common electrode terminal portion 543A and the opposing electrode 544 that are formed on the fixed substrate 51 are exposed.

In order to prevent a bend, the movable portion 521 is formed to have a thickness size larger than the holding portion 522.

The holding portion 522 is a diaphragm surrounding the circumference of the movable portion 521, and by bending the holding portion 522, the movable portion 521 moves so as to advance or retreat with respect to the fixed substrate 51.

In this embodiment, although the holding portion 522 having a diaphragm shape is represented as an example, a configuration may be employed in which a holding portion having a plurality of beam structures arranged at positions that are symmetrical with respect to a point as the center of the movable portion is arranged.

On a face of the holding portion 522 that faces the fixed substrate 51, the movable electrode 542 that faces the fixed electrode 541 with a predetermined gap (inter-electrode gap) interposed therebetween is formed. This movable electrode 542 is formed by a conductive film, and, for example, is formed by a Cr/Au film that has the same configuration as that of the fixed electrode 541.

This movable electrode 542 includes the outer movable electrode 542A (configuring a first partial electrode according to the embodiment of the invention) that faces the outer fixed electrode 541A and an inner movable electrode 542B (configuring a second partial electrode according to the embodiment of the invention) that faces the inner fixed electrode 541B. The outer movable electrode 542A is formed in a "C" shape, and the inner movable electrode 542B is formed in a ring shape on the inner diameter side of the outer movable electrode 542A.

In addition, similarly to the fixed electrode 541, the surface of the movable electrode 542 is covered with the insulting film 59, and whereby discharge between the fixed electrode 541 and the movable electrode 542 is prevented.

As shown in FIG. 2, driving electrode lines 545 are formed to extend from the outer movable electrode 542A and the inner movable electrode 542B along a diagonal line (for example, a diagonal line formed from the lower right side to the upper left side in FIG. 2) of the movable substrate 52.

More specifically, an outer driving electrode line 545A (configuring a first driving electrode line according to the embodiment of the invention) that extends toward the upper left vertex of the movable substrate 52 is formed from the outer circumference of the outer movable electrode 542A, and, in the tip end thereof, the outer driving terminal portion 546A is formed. In addition, an inner driving electrode line 545B (configuring a second driving electrode line according to the embodiment of the invention) that extends toward the lower right vertex of the movable substrate 52 is formed from the outer circumference of the inner movable electrode 542B, and, in the tip end thereof, the inner driving terminal portion 546B is formed.

The driving terminal portions 546A and 546B, as described above, are arranged so as to face the opposing electrode 544 that is formed on the fixed substrate 51 and are conductive through the Ag paste 544A. By connecting the opposing electrode 544 or the Ag paste 544A to the filter driving circuit unit 7, signals transmitted from the filter driving circuit unit 7 can be input to the driving terminal portions 546A and 546B.

On a face of the movable portion 521 that faces the fixed substrate 51, the movable reflective film 57 that faces the fixed reflective film 56 through a gap is formed. Since the configuration of the movable reflective film 57 is the same as that of the fixed reflective film 56, the description thereof will not be presented here.

3-1-3. Configuration of Temperature Sensor

The temperature sensor 55 is disposed to the outer side of the holding portion 522 on a face of the movable substrate 52 that does not face the fixed substrate 51 in the plan view acquired by viewing the movable substrate 52 from the substrate thickness direction. As this temperature sensor 55, a resistor of which a resistance value changes in accordance with a change in the temperature, for example, a thermistor or a metal resistance temperature detector may be used.

One pair of sensor wirings (a first sensor wiring 551 and a second sensor wiring 552) is connected to the temperature sensor 55. The resistance value of the temperature sensor 55 changes in accordance with the temperature of the tunable interference filter 5, and accordingly, by applying a voltage between the sensor wirings 551 and 552, a current according to the temperature flows through the temperature sensor 55. Accordingly, by detecting the current, the temperature of the tunable interference filter 5 can be measured.

In addition, out of the one pair of the sensor wirings of the temperature sensor 55, the first sensor wiring 551 is connected to the outer driving terminal portion 546A as a first driving terminal portion, and the second sensor wiring 552 is connected to the inner driving terminal portion 546B as a second driving terminal portion.

Here, the above-described Ag paste 544A is formed from the gap between the fixed substrate 51 and the movable substrate 52 to the upper face side of the movable substrate 52, and by coating the upper face of the sensor wiring 551 (552) with the Ag paste 544A, the sensor wiring 551 (552) and the outer driving terminal portion 546A (the inner driving terminal portion 546B) and the opposing electrode 544 becomes conductive.

3-2. Configuration of Detection Unit

The detection unit 6 is configured so as to include a plurality of photo-sensitive devices. As the photo-sensitive devices, photoelectric conversion devices, for example, CCD (Charge Coupled Device) elements or the like may be used. This detection unit 6 receives light transmitted through the tunable interference filter 5 by using the plurality of light-sensitive devices and outputs an optical intensity detection signal according to the amount of received light.

3-3. Configuration of Filter Driving Circuit Unit

Figure 4:
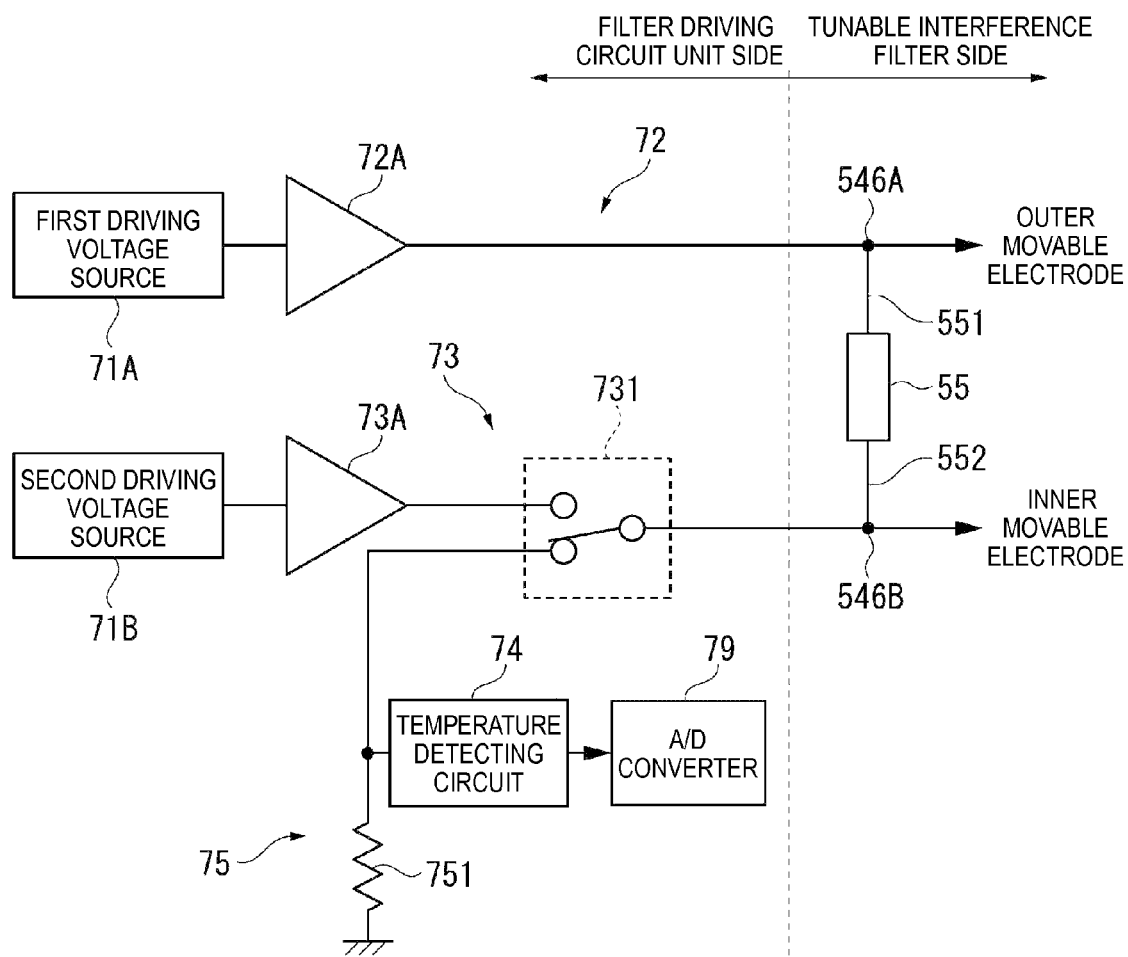
FIG. 4 is a diagram showing a circuit configuration of an optical module according to the first embodiment.

FIG. 4 is a diagram showing a circuit configuration of the optical module 3.

The filter driving circuit unit 7, as shown in FIGS. 1 and 4, includes: a voltage source 71; a first driving circuit 72; a second driving circuit 73; a temperature detecting circuit 74; a voltage divider 75; a grounded circuit 76; an I-V conversion circuit 77; a second switch 78; and an A/D converter 79.

The voltage source 71 includes a first driving voltage source 71A that outputs a voltage to be applied between the outer movable electrode 542A and the outer fixed electrode 541A and a voltage to be applied to the temperature sensor 55 and a second driving voltage source 71B that outputs a voltage to be applied between the inner movable electrode 542B and the inner fixed electrode 541B.

This voltage source 71 is connected to the control device 4 and drives the first driving voltage source 71A and the second driving voltage source 71B based on a control signal input from the control device 4.

The first driving circuit 72 connects the first driving voltage source 71A and the outer driving terminal portion 546A through a buffer 72A.

The second driving circuit 73 is a circuit that connects the inner driving terminal portion 546B, the second driving voltage source 71B, and the temperature detecting circuit 74 together, and switching between connection statuses is performed by a first switch 731. This first switch 731 switches between a first switching status in which the inner driving terminal portion 546B and the second driving voltage source 71B are connected through the buffer 73A and a second switching status in which the inner driving terminal portion 546B and the temperature detecting circuit 74 are connected to each other. This first switch 731 is connected to the control device 4 and performs switching between the connection statuses based on a control signal transmitted from the control device 4.

Accordingly, in the state in which the first switch 731 is switched to the first switching status, the second driving circuit 73 becomes a circuit that can apply a voltage between the inner movable electrode 542B and the inner fixed electrode 541B by using the second driving voltage source 71B. On the other hand, in the state in which the first switch 731 is switched to the second switching status, the second driving circuit 73 becomes a circuit that can input a temperature detection signal output from the temperature sensor 55 to the temperature detecting circuit 74.

The temperature detecting circuit 74 is connected to the first switch 731 and the second switch 78. Thus, in a case where the first switch 731 is switched to the second switching status, and the second switch 78 is switched to a status of connecting the A/D converter 79 and the temperature detecting circuit 74 to each other, the temperature detecting circuit 74 is in a connection status (temperature detectable status) in which a temperature detection signal input from the temperature sensor 55 can be output to the A/D converter 79.

This temperature detecting circuit 74 is configured so as to include a filter circuit such as a low pass filter and eliminates a noise component from the temperature detection signal that is input from the temperature sensor 55.

The voltage divider 75 is disposed between the temperature detecting circuit 74 and the first switch 731 and is grounded through a load resistor 751. This voltage divider 75 is a circuit that is arranged so as to generate an electric potential between the one pair of sensor wirings 551 and 552 of the temperature sensor 55.

In the above-described configuration that includes the temperature detecting circuit 74 and the voltage divider 75, in the temperature detectable status, the second sensor wiring 552 of the temperature sensor 55 is connected to the voltage divider 75, and a voltage divided by the temperature sensor 55 and the voltage divider 75 is output to the A/D converter 79 through the filter circuit of the temperature detecting circuit 74.

The grounded circuit 76 is a circuit that grounds the common electrode terminal portion 543A of the tunable interference filter 5.

The I-V conversion circuit 77 is a circuit that converts a light intensity detection signal (current) output from the detection unit 6 into a voltage.

The second switch 78 is a switch that switches between a third switching status in which the A/D converter 79 and the I-V conversion circuit 77 are connected together and a fourth switching status in which the A/D converter 79 and the temperature detecting circuit 74 are connected together. This second switch 78 is connected to the control device 4 and changes the connection status based on a control signal transmitted from the control device 4.

The A/D converter 79 is a circuit that converts an input analog signal into a digital signal and outputs the digital signal to the control device 4.

4. Configuration of Control Unit

The control device 4 controls the overall operation of the optical measurement device 1.

This control device 4 is a computer that is configured by a memory 41, a calculation circuit unit 42 configured by a CPU (Central Processing Unit) or the like, and the like. As the control device 4, for example, a general-purpose personal computer, a mobile information terminal, a measurement dedicated computer, or the like may be used.

The control device 4 is software that is executed by the calculation circuit unit 42, and, as shown in FIG. 1, includes a process switching section 421, a temperature acquiring section 422, a voltage calculating section 423, a voltage control section 424, and a light intensity acquiring section 425.

In the memory 41, various programs executed by the calculation circuit unit 42 and various kinds of data are stored.

In addition, the memory 41 stores a table data (V-λ data) that represents the wavelength of transmitted light detected by the detection unit 6 with respect to a driving voltage applied to the electrostatic actuator 54 therein. This V-λ data is individually set for each temperature of the tunable interference filter 5.

Furthermore, the memory 41 stores a table data (temperature conversion data) that represents temperature with respect to a signal value of the temperature detection signal that is output from the temperature sensor 55.

Next, a process switching section 421, a temperature acquiring section 422, a voltage calculating section 423, a voltage control section 424, and a light intensity acquiring section 425 that are software executed in the calculation circuit unit 42 will be described.

The process switching section 421 performs a process of switching the first switch 731 and the second switch 78 of the optical module 3.

In other words, the process switching section 421 switches the first switch 731 to the first switching status and switches the second switch to the third switching status in an optical characteristic measuring process in which the optical characteristics of a measurement target are measured by controlling the gap of the tunable interference filter 5 (light intensity measurable status).

In addition, the process switching section 421 switches the first switch 731 to the second switching status and switches the second switch 78 to the fourth switching status in a temperature detecting and measuring process in which the temperature of the tunable interference filter 5 is detected by using the temperature sensor 55 (temperature detectable status).

Here, as a timing at which the temperature detectable status is switched to by the process switching section 421, for example, there is a timing at the time of calibration, a timing that is based on the numbers of the optical characteristic processes, a timing that is based on a timer, or the like.

In other words, in a case where the optical characteristics of a measurement target are to be acquired by the optical measurement device 1, it is necessary that, for example, white light as reference light is emitted from the lamp 21 of the light source device 2 so as to be incident to the optical module 3 or light reflected by a white plate is incident to the optical module 3, and a calibration process in which the amount of correction of the light intensity of the white light is performed. When the calibration process is performed, the process switching section 421, first, switches the first switch 731 and the second switch 78 to the temperature detectable status and performs a temperature detecting operation. Accordingly, a driving voltage that is appropriate to the temperature of the tunable interference filter 5 can be applied, whereby the precision of the calibration process can be improved.

In addition, in a case where the optical characteristics are continuously measured by the optical measurement device 1 for a long time, the temperature of the tunable interference filter 5 may change, for example, due to the heat of the lamp 21 or the like. Thus, when the number of the optical characteristic processes reaches a specified value, for example, that is stored in the memory 41 in advance, or when the time counted by an internal timer reaches a specified time that is stored in the memory 41 in advance, a temperature detecting process is performed. Accordingly, even in a case where the temperature of the tunable interference filter 5 changes during the measurement process, a driving voltage that is appropriate to the temperature can be applied, whereby the measurement precision can be improved.

The temperature acquiring section 422 switches the first switch 731 and the second switch 78 to the temperature detectable state by using the process switching section 421 and, when a temperature detection signal output from the temperature sensor 55 is input to the control device 4, acquires the temperature of the tunable interference filter based on the temperature detection signal.

More specifically, the temperature acquiring section 422 reads out temperature conversion data from the memory 41 and acquires temperature according to the detected temperature detection signal based on the temperature conversion data.

The voltage calculating section 423 calculates a voltage to be applied to the electrostatic actuator 54 of the tunable interference filter 5 based on the temperature acquired by the temperature acquiring section 422.

More specifically, the voltage calculating section 423 reads out V-λ data corresponding to the temperature acquired by the temperature acquiring section 422 from the memory 41. In the V-λ data, a voltage to be set by the first driving voltage source 71A, that is, a voltage to be set by the second driving voltage source 71B for the measured wavelength is recorded. Then, the voltage calculating section 423 acquires a voltage of the first driving voltage source 71A and a voltage of the second driving voltage source 71B for the target wavelength to be transmitted through the tunable interference filter 5 from the read-out V-λ data.

Here, although an example is shown in which the voltage calculating section 423 acquires a voltage value for the target wavelength from V-λ data for the temperature stored in the memory 41, the configuration is not limited thereto. For example, a configuration may be employed in which V-λ data of reference temperature (for example 23°) is stored in the memory 41 in advance, and the voltage calculating section 423 acquires a voltage value for a target wavelength by applying a correction value that is based on the temperature acquired by the temperature acquiring section 422 to the V-λ data.

In addition, a configuration may be employed in which a V-λ approximation formula is generated based on actually measured values and is stored in the memory 41 at the time of manufacturing the optical module 3. In such a case, the voltage calculating section 423 calculates a difference between the temperature acquired by the temperature acquiring section 422 and the reference temperature and corrects the V-λ approximation formula, and acquires a voltage value for the target wavelength based on the corrected V-λ approximation value.

In a case where V-λ data for each temperature is stored in the memory 41, a total data size of the V-λ data becomes large, and it is necessary to use the memory 41 having a large storage capacity. In contrast to this, as described above, in a case where only the V-λ data as a reference or the V-λ approximation formula is stored, and the V-λ data that is based on measured temperature is used or the V-λ approximation formula is corrected so as to be used, the memory capacity may be small, and the configuration of the system can be further simplified.

The voltage control section 424 applies a driving voltage to the electrostatic actuator 54 and the temperature sensor 55.

In other words, in a case where the connection statuses of the first switch 731 and the second switch 78 are switched to the temperature detectable status by the process switching section 421, the voltage control section 424 applies a temperature detection voltage set in advance to the temperature sensor 55 from the first driving voltage source 71A.

In addition, in a case where the connection statuses of the first switch 731 and the second switch 78 are switched to the light intensity measurable status by the process switching section 421, the voltage control section 424 applies a voltage to the electrostatic actuator 54 from the first driving voltage source 71A and the second driving voltage source 71B based on the voltage value acquired by the voltage calculating section 423.

The light intensity acquiring section 425 acquires the light intensity of the measurement target light received by the detection unit 6 and, for example, stores the light intensity in the memory 41.

5. Operation of Optical Measurement Device

Figure 5:
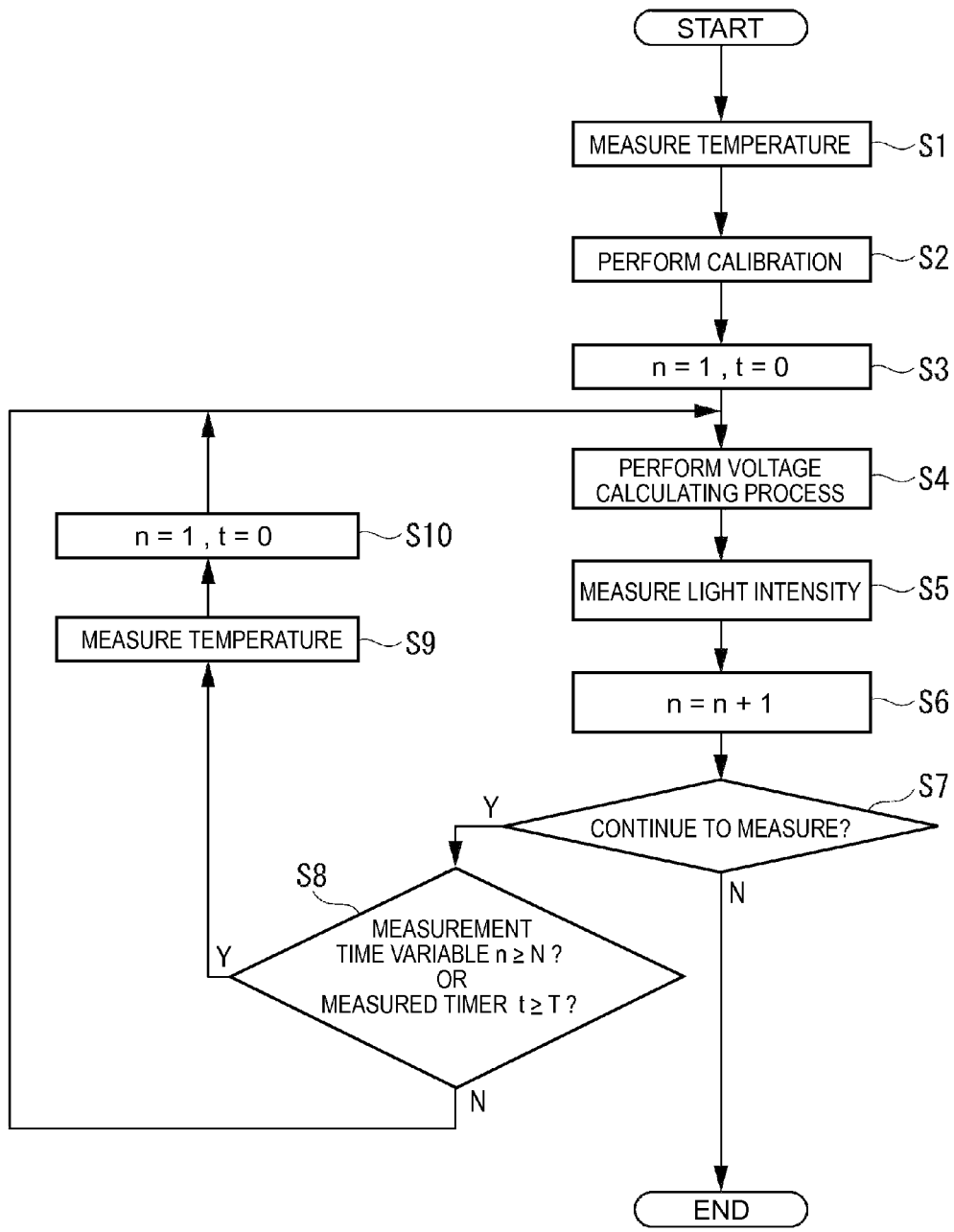
FIG. 5 is a flowchart of a light intensity measuring process of an optical measurement device according to the first embodiment.

Next, a measurement operation of the optical measurement device 1 for light as a measurement target will be described based on a flowchart of the optical measurement device 1 according to this embodiment shown in FIG. 5.

In a case where the chromaticity of a measurement target is measured by the optical measurement device 1, first, a calibration process is performed.

In the process, first, the optical measurement device 1 performs a temperature measuring process (Step S1). More specifically, the process switching section 421 of the control device 4 switches the connection statuses of the first switch 731 and the second switch 78 to the temperature detectable status. Then, the voltage control section 424 applies a temperature detection voltage to the temperature sensor 55 from the first driving voltage source 71A, and the temperature acquiring section 422 acquires the temperature of the tunable interference filter 5 based on a temperature detection signal that is output from the temperature sensor 55. In addition, the temperature acquiring section 422 stores the acquired temperature in the memory 41. At this time, in a case where temperature information has already been stored in the memory 41, an update process is performed in which the temperature stored in the memory 41 is rewritten with the measured temperature.

Then, the optical measurement device 1 performs the calibration process (Step S2). In this calibration process, the control device 4 allows white light as reference light to be emitted from the lamp 21 so as to be incident to the tunable interference filter 5 of the optical module 3 by controlling the light source device 2. Alternatively, light emitted from the lamp 21 may be reflected by a reference white plate so as to be incident to the tunable interference filter 5 of the optical module 3.

Then, the optical measurement device 1 allows the voltage calculating section 423 to read out V-λ data corresponding to the measured temperature acquired from the memory 41 in Step S1 and to acquire voltages (the voltage of the first driving voltage source 71A and the voltage of the second driving voltage source 71B) corresponding to the measured wavelength based on the V-λ data. In addition, the process switching section 421 switches the connection statuses of the first switch 731 and the second switch 78 to the light intensity measurable status, and the voltage control section 424 drives the electrostatic actuator 54 by controlling the first driving voltage source 71A and the second driving voltage source 71B based on the voltages acquired by the voltage calculating section 423.

By driving the electrostatic actuator 54, light of a wavelength corresponding to the size of a gap between the fixed reflective film 56 and the movable reflective film 57 is transmitted through the tunable interference filter 5 and is received by the detection unit 6. Then, the control device 4 acquires the light intensity for each wavelength of the visible light region and performs white calibration.

After the above-described calibration process is performed, an optical characteristic measuring process for a measurement target is performed.

In this process, first, the control device 4 performs an initialization process (Step S3), sets a measurement time variable n to "1", and resets the value t of the internal timer to "0".

Thereafter, a process of calculating a voltage that is necessary for allowing the detection unit 6 to detect a desired wavelength is performed based on the measured temperature that is measured in Step S1 (Step S4).

In this voltage calculating process, as described above, the voltage calculating section 423 reads out the V-λ data corresponding to the measured temperature read out from the memory 41 and acquires a voltage value corresponding to the measured wavelength. In addition, in a case where a configuration is employed in which only the V-λ data at the reference temperature or the V-λ approximation formula is stored in advance, the V-λ data or the V-λ approximation formula is corrected based on a difference between measured temperature and the reference temperature, and a voltage for the measured wavelength is calculated.

Thereafter, the optical measurement device 1 performs a light intensity measuring process (in Step S5).

In Step S5, the process switching section 421 switches the first switch 731 and the second switch 78 to the light intensity measurable state. Then, the voltage control section 424 outputs the voltages acquired in Step S4 from the first driving voltage source 71A and the second driving voltage source 71B, and thereby driving the electrostatic actuator 54.

Accordingly, light of the measured wavelength is transmitted to the detection unit 6 from the tunable interference filter 5, and a light intensity detection signal output from the detection unit 6 is input to the control device 4 through the I-V conversion circuit 77 and the A/D converter 79.

The light intensity acquiring section 425 of the control device 4 acquires the intensity of light of a measured wavelength based on the light intensity detection signal. In addition, the light intensity acquiring section 425 stores the acquired light intensity in the memory 41.

Then, after the light intensity measuring process of Step S5 is performed, the control device adds "1" to the measurement time variable n (Step S6).

Next, the control device 4 determines whether or not the measurement process is continued (Step S7). For example, in a case where an input indicating the end of the measurement process is made by a user operating the control device 4, the optical measurement device 1 completes a series of the measurement process.

On the other hand, in a case where an input indicating the continuation of the measurement process is made by a user in a case where the light intensity is measured while the wavelength is sequentially changed for all the wavelengths of the visible light region, other optical characteristics of the measurement target are measured, or the like, the optical measurement device 1 continues to perform the light intensity measuring process.

In such a case, the optical measurement device 1 determines whether or not the measurement time variable n is equal to or larger than a specified measurement times N, or the value t of the internal timer is equal to or larger than a specified measurement time T (Step S8).

In a case where the measurement time variable n is equal to or greater than the specified measurement times N, or the value t of the internal timer is equal to or greater than the specified measurement time T, a process of measuring the temperature of the tunable interference filter 5 is performed. This process is similar to the process of Step S1. Then, the temperature acquiring section 422 updates the temperature stored in the memory 41 by rewriting with the measured temperature that has been acquired (Step S9).

In addition, the control device 4, as in Step S3, performs an initialization process, sets "1" to the measurement time variable n, and resets the value t of the internal timer to "0" (Step S10).

Thereafter, the control device 4 performs a light intensity measuring process by performing the process of Steps S4 to S7. At this time, in the voltage calculating process of Step S4, a voltage is acquired based on the measured temperature that is stored in Step S9 and is stored in the memory 41.

On the other hand, in Step S8, in a case where the measurement time variable n is less than N, and the value t of the internal timer is less than the specified measurement time T, the control device 4 performs the process of Steps S4 to S7 without performing the temperature measuring process.

6. Operations and Advantages of First Embodiment

As described above, in the optical module 3 of the optical measurement device 1 according to the first embodiment, the temperature sensor 55 is disposed in the tunable interference filter 5, and the first sensor wiring 551 out of one pair of the sensor wirings of the temperature sensor 55 is connected to the outer driving terminal portion 546A. In addition, in the filter driving circuit unit 7 of the optical module 3, the first driving circuit 72 that connects the outer driving terminal portion 546A and the first driving voltage source 71A is disposed.

In such a configuration, the outer driving terminal portion 546A can be used as a connection terminal that connects the outer movable electrode 542A and the filter driving circuit unit 7 and as a connection terminal that connects the temperature sensor 55 and the filter driving circuit unit 7. Accordingly, a sensor terminal used for connecting the first sensor wiring 551 and the filter driving circuit unit 7 does not need to be additionally arranged in the tunable interference filter 5, and, even in a case where the temperature sensor 55 is arranged in the tunable interference filter 5, the wiring configuration can be simplified.

In addition, the first driving voltage source 71A outputs a voltage to be applied between the outer fixed electrode 541A and the outer movable electrode 542A in the light intensity measuring process and outputs a temperature detection voltage to be applied to the temperature sensor 55 in the temperature detecting process. Accordingly, for example, a configuration is not necessary in the filter driving circuit unit 7 in which a driving voltage source used for driving the temperature sensor 55 is additionally arranged, and a circuit connecting the driving voltage source for the temperature sensor and the temperature sensor 55 is arranged, whereby the circuit configuration of the filter driving circuit unit 7 can be simplified as well.

In addition, in the optical module 3 having such a simplified wiring configuration, the labor of wiring or the number of the constituent members can be reduced. Accordingly, the manufacturing cost can be reduced, and whereby the cost of the optical measurement device 1 can be reduced.

In addition, the second sensor wiring 552 of the temperature sensor 55 is connected to the inner driving terminal portion 546B that is used for driving the inner movable electrode 542B. In addition, in the filter driving circuit unit 7, the first switch 731 is disposed in the second driving circuit 73 that is connected to the inner driving terminal portion 546B. The first switch 731 performs switching between the first switching status in which the second driving voltage source 71B and the inner driving terminal portion 546B are connected and the second switching status in which the temperature detecting circuit 74 and the inner driving terminal portion 546B are connected.

In such a configuration, the first switch 731 is switched to the first switching status in the light intensity measuring process, and the first switch 731 is switched to the second switching status in the temperature detecting process. As above, by employing a simple circuit configuration in which only the status of the first switch 731 is changed, switching between the light intensity measuring process and the temperature detecting process can be performed. In addition, since an additional terminal for the second sensor wiring 552 does not need to be arranged on the movable substrate 52, the wiring configuration of the tunable interference filter 5 can be simplified. Furthermore, since such a sensor terminal does not need to be arranged, the circuit configuration of the filter driving circuit unit 7 can be simplified as well.

In addition, the temperature sensor 55 is formed by a thermistor or a metal resistance temperature detector of which a resistance value changes in accordance with a change in the temperature. In such a temperature sensor 55, by detecting a temperature detection signal for the applied voltage, the temperature can be easily measured, and the configuration of the tunable interference filter 5 or the filter driving circuit unit 7 can be further simplified.

In a case where a voltage is applied to the above-described temperature sensor 55, an electric potential difference between the first sensor wiring 551 and the second sensor wiring 552 of the temperature sensor 55 needs to be set. In contrast to this, according to this embodiment, by disposing the voltage divider 75, the second sensor wiring 552 is grounded through the load resistor 751. Accordingly, the electric potential of the second sensor wiring 552 can be set to "0", and the voltage value set by the first driving voltage source 71A can be applied to the temperature sensor 55 with high precision, whereby a precise temperature detecting result can be acquired.

In the optical measurement device 1, switching of the first switch 731 and the second switch 78 is controlled by the process switching section 421 of the control device 4. When the first switch 731 is in the first switching status, the second switch 78 is switched to the third switching status to be in the light intensity measurable state. On the other hand, when the first switch 731 is in the second switching status, the second switch 78 is switched to the fourth switching status so as to be in the temperature detectable status.

As above, by controlling the switching of the first switch 731 and the second switch 78, switching between the temperature detecting process and the light intensity detecting process is performed. Accordingly, the control operation of switching between the processes can be accurately performed in a simple manner, and the circuit configuration can be simplified.

Second Embodiment

Next, an optical measurement device according to a second embodiment of the invention will be described with the accompanying drawings.

Figure 6:
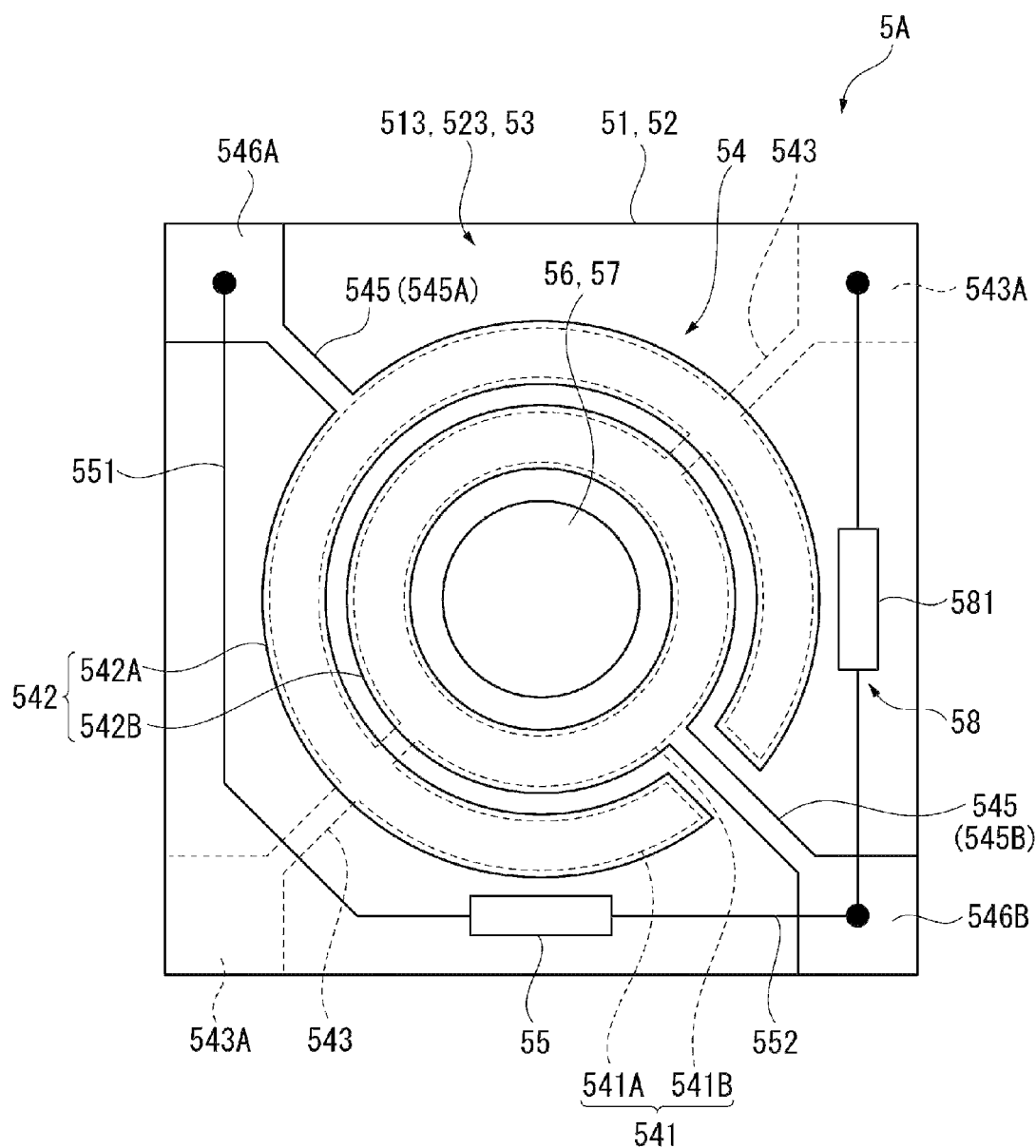
FIG. 6 is a plan view showing a schematic configuration of a tunable interference filter according to a second embodiment.
Figure 7:
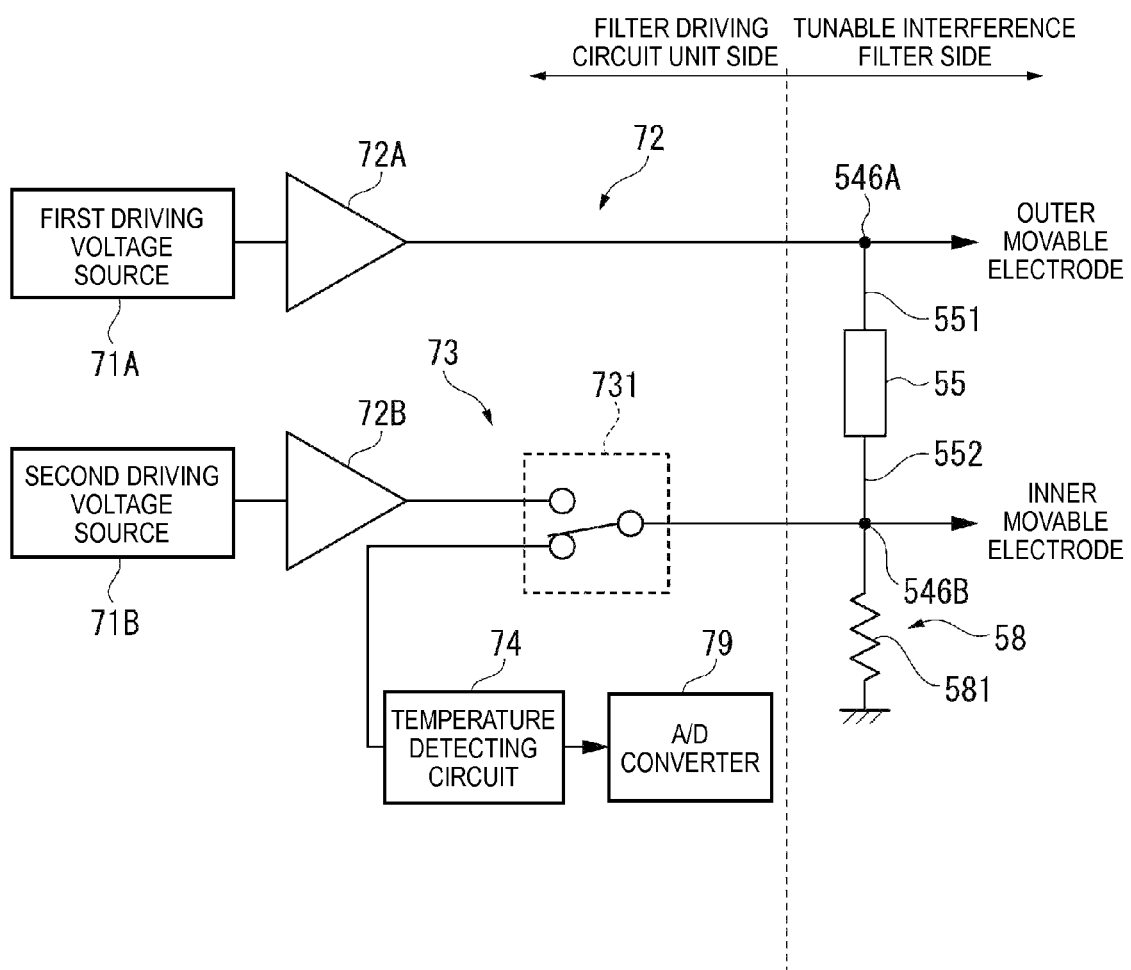
FIG. 7 is a diagram showing a circuit configuration of an optical module according to the second embodiment.

FIG. 6 is a plan view of a tunable interference filter according to the second embodiment, and FIG. 7 is a circuit diagram showing a part of the driving circuit unit of an optical module according to the second embodiment. In the description of embodiments presented hereinafter, the same reference numeral is assigned to the same configuration as that of the first embodiment, and the description thereof will not be presented or will be simplified.

In the above-described embodiment, a configuration has been represented as an example in which the voltage divider 75 is disposed between the first switch 731 of the second driving circuit 73 and the temperature detecting circuit 74. However, in the configuration in which the voltage divider 75 is disposed inside the filter driving circuit unit 7, as in the first embodiment, a distance between the temperature sensor 55 and the voltage divider 75 becomes long. Accordingly, a voltage applied to the temperature sensor 55 may be different from a voltage set by the first driving voltage source 71A due to the resistance of the second driving circuit 73 and the like that are disposed from the temperature sensor 55 to the voltage divider 75.

In contrast to this, according to the second embodiment, a configuration is employed in which the voltage divider 58 is disposed on the tunable interference filter 5A so as to form a configuration in which the voltage to be applied to the temperature sensor 55 can be controlled more precisely.

More specifically, as shown in FIGS. 6 and 7, in the tunable interference filter 5A according to the second embodiment, in addition to the configuration of the tunable interference filter 5 according to the first embodiment, a voltage divider 58 that connects the inner driving terminal portion 546B and the common electrode terminal portion 543A through a load resistor 581 is included. The load resistor 581 has a resistance value that is sufficiently larger than that of the temperature sensor 55.

Operation and Advantages of Second Embodiment

In the above-described optical measurement device according to the second embodiment, the voltage divider 58 that connects the inner driving terminal portion 546B and the common electrode terminal portion 543A through the load resistor 581 is disposed on the movable substrate 52 of the tunable interference filter 5A.

In such a configuration, the common electrode terminal portion 543A is connected to the grounded circuit 76 inside the filter driving circuit unit 7. Accordingly, the electric potential of the second sensor wiring 552 can be precisely set to "0". Therefore, the voltage that is set by the first driving voltage source 71A is applied to the temperature sensor 55 more accurately than the above-described first embodiment, whereby precise temperature can be detected.

Third Embodiment

Next, an optical measurement device according to a third embodiment of the invention will be described with the accompanying drawings.

Figure 8:
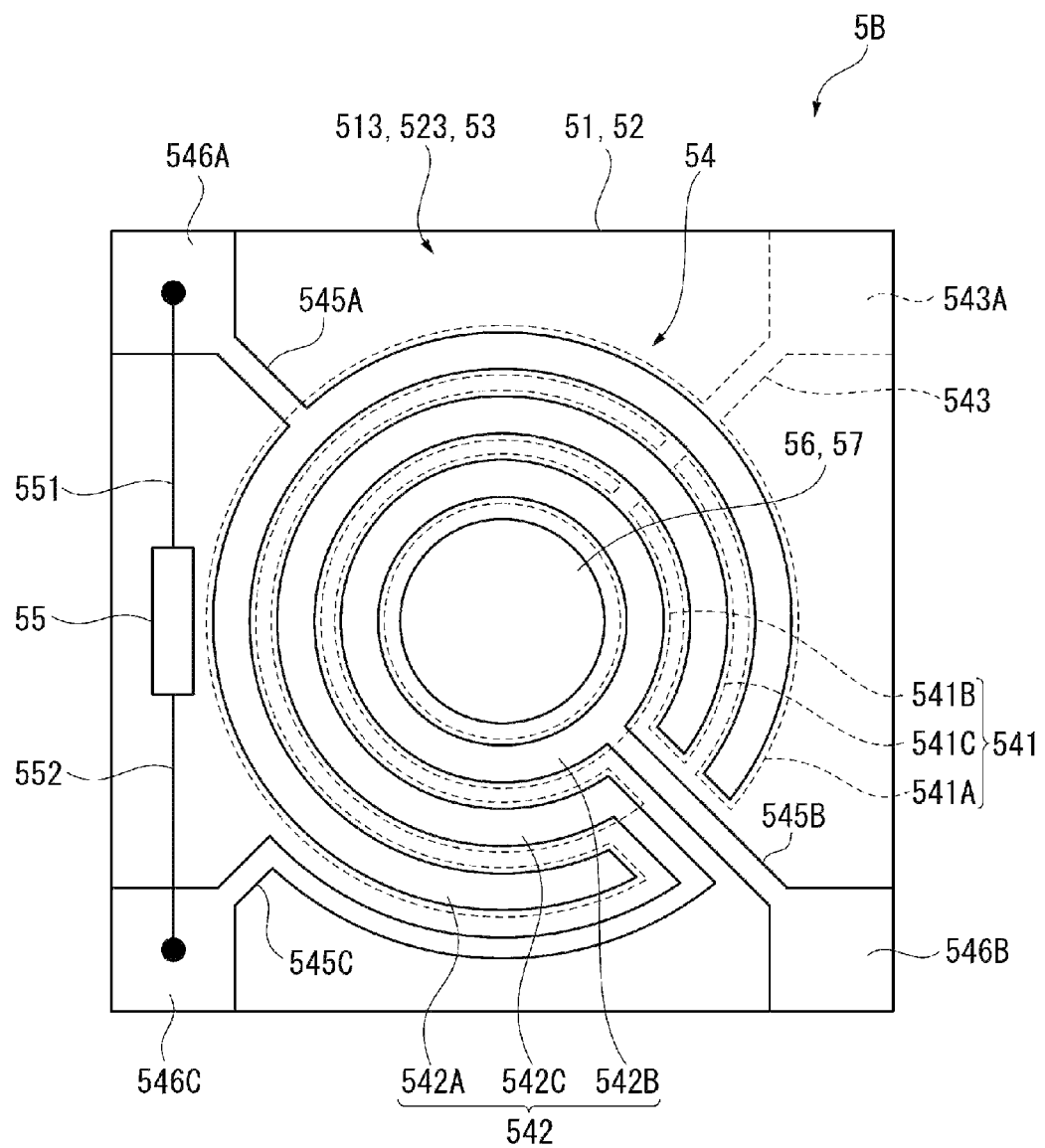
FIG. 8 is a plan view showing a schematic configuration of a tunable interference filter according to a third embodiment.

FIG. 8 is a plan view of a tunable interference filter according to the third embodiment of the invention.

In the first and second embodiments described above, the electrostatic actuator 54 is configured by the outer electrode portion that is configured by the outer fixed electrode 541A and the outer movable electrode 542A and the inner electrode portion that is configured by the inner fixed electrode 541B and the inner movable electrode 542B. In contrast to this, in the tunable interference filter 5B of the optical measurement device according to the third embodiment, an electrostatic actuator 54 is configured by three electrode portions.

In other words, as shown in FIG. 8, the electrostatic actuator 54 of the tunable interference filter 5B includes an outer electrode portion that is configured by an outer fixed electrode 541A and an outer movable electrode 542A, an inner electrode portion that is configured by an inner fixed electrode 541B and an inner movable electrode 542B, and an intermediate electrode portion that is configured by an intermediate fixed electrode 541C and an intermediate movable electrode 542C.

Here, the outer fixed electrode 541A, the inner fixed electrode 541B, and the intermediate fixed electrode 541C are interconnected through a common electrode line 543. This common electrode line 543 extends toward one vertex (a vertex located on the upper right side in FIG. 8) of the fixed substrate 51, and a common electrode terminal portion 543A is included in the tip end of the extension.

The intermediate movable electrode 542C that configures the movable electrode 542 is disposed between the outer movable electrode 542A and the inner movable electrode 542B. In addition, in the intermediate movable electrode 542C, an intermediate driving electrode line 545C that extends to one vertex (a vertex located on the lower left side in FIG. 8) of the movable substrate 52 is formed, and an intermediate driving terminal portion 546C is disposed in the tip end of the extension of the intermediate driving electrode line 545C.

In the tunable interference filter 5B, a first sensor wiring 551 of the temperature sensor 55, similarly to the first embodiment, is connected to the outer driving terminal portion 546A. In addition, a second sensor wiring 552 is connected to the intermediate driving terminal portion 546C.

In other words, according to this embodiment, the outer movable electrode 542A configures a first partial electrode according to the embodiment of the invention, and the intermediate movable electrode 542C configures a second partial electrode according to the embodiment of the invention.

The filter driving circuit unit of the optical module 3 having the above-described configuration, although not shown in the figure, is configured similarly to the filter driving circuit unit 7 according to the first embodiment. In other words, the filter driving circuit unit according to the third embodiment includes a first driving circuit that connects the outer driving terminal portion 546A and a first driving voltage source through a buffer, a second driving circuit that connects the intermediate driving terminal portion 546C and a second driving voltage source through a buffer, and a third driving circuit that connects the inner driving terminal portion 546B and a third driving voltage source through a buffer. In addition, in the second driving circuit, similarly to the first and second embodiments, a first switch 731 is disposed. Accordingly, in the temperature detecting process, a temperature detection signal output from the temperature sensor 55 can be output to a temperature detecting circuit 74.

Operation and Advantages of Third Embodiment

In the above-described optical measurement device according to the third embodiment, the same advantages as those of the first embodiment and the second embodiment can be acquired. In other words, the first sensor wiring 551 is connected to the outer driving terminal portion 546A, and the second sensor wiring 552 is connected to the intermediate driving terminal portion 546C. Accordingly, even in a case where the electrostatic actuator 54 of the tunable interference filter 5B is arranged, a terminal portion dedicated for connecting the sensor wirings 551 and 552 of the temperature sensor 55 is not necessary. Therefore, the tunable interference filter 5B including the temperature sensor 55 can be provided by a simple wiring configuration.

In addition, in the filter driving circuit unit 7, a voltage source dedicated for driving the temperature sensor 55 and a circuit used for connecting the voltage source and the sensor wirings 551 and 552 are unnecessary, whereby the wiring configuration can be simplified.

In the configuration in which the electrostatic actuator 54 is divided into three electrode portions, as in the first and second embodiments, a gap changing process can be controlled with precision higher than that of a case where the electrostatic actuator 54 is configured by two electrode portions. Accordingly, a light intensity measuring process having higher precision can be performed.

Modified Example of Third Embodiment

The configuration of the filter driving circuit unit according to the third embodiment, although not shown in the figure, is similar to that of the first embodiment, and a configuration is formed in which a voltage divider is arranged inside the filter driving circuit unit. On the other hand, as in the second embodiment, a configuration may be employed in which a voltage divider 58 is arranged inside the tunable interference filter.

Figure 9:
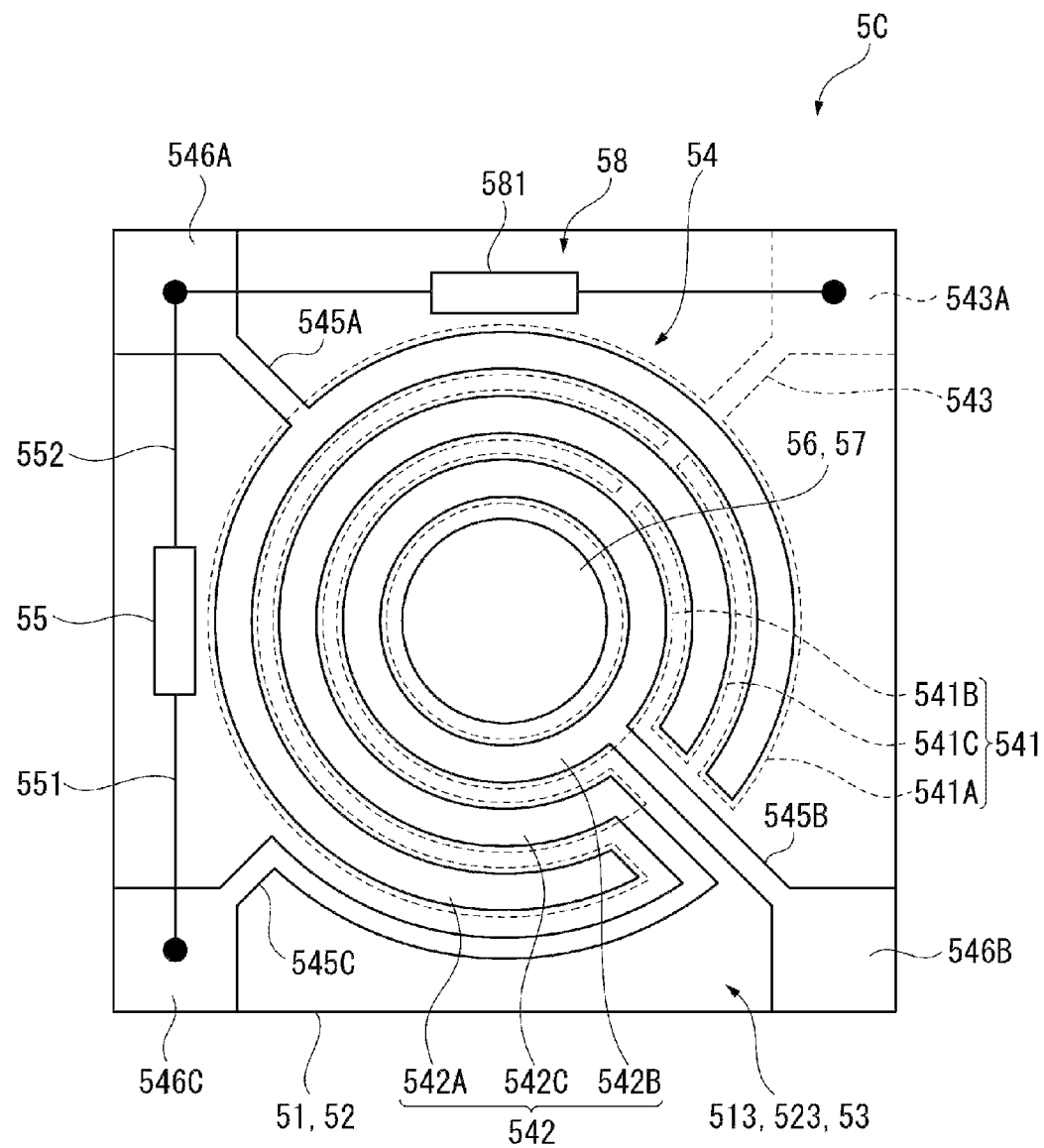
FIG. 9 is a plan view showing a schematic configuration of a tunable interference filter according to a modified example of the third embodiment.

FIG. 9 is a plan view showing an example of a configuration in which the voltage divider 58 is arranged on the movable substrate 52 in a tunable interference filter in which the electrostatic actuator 54 is configured by three electrode portions.

In the example shown in FIG. 9, the intermediate movable electrode 542C configures a first partial electrode according to the embodiment of the invention, the outer movable electrode 542A configures a second partial electrode according to the embodiment of the invention, the intermediate driving electrode line 545C configures a first driving electrode line according to the embodiment of the invention, and the outer driving electrode line 545A configures a second driving electrode line according to the embodiment of the invention.

In addition, the first sensor wiring 551 is connected to the intermediate driving terminal portion 546C, and the second sensor wiring 552 is connected to the outer driving terminal portion 546A.

Furthermore, on the movable substrate 52, the voltage divider 58 that connects the outer driving terminal portion 546A and the common electrode terminal portion 543A through the load resistor 581 is disposed.

In the filter driving circuit unit of an optical module 3 that includes the above-described tunable interference filter 5C, the second driving circuit including the first switch is connected to the outer driving terminal portion 546A, and the first driving circuit is connected to the intermediate driving terminal portion 546C.

In addition, in the third embodiment and the modified example of the third embodiment described above, the electrostatic actuator 54 including three electrode portions has been represented as an example. However, the embodiment of the invention can be similarly applied to a tunable interference filter in which the electrostatic actuator 54 is configured by more electrode portions as well.

Fourth Embodiment

Next, an optical measurement device according to a fourth embodiment of the invention will be described.

In the above-described third embodiment, a configuration has been represented as an example in which the electrostatic actuator 54 includes a plurality of electrode portions. However, in the fourth embodiment, an example is represented in which the electrostatic actuator 54 is configured by one electrode portion.

Figure 10:
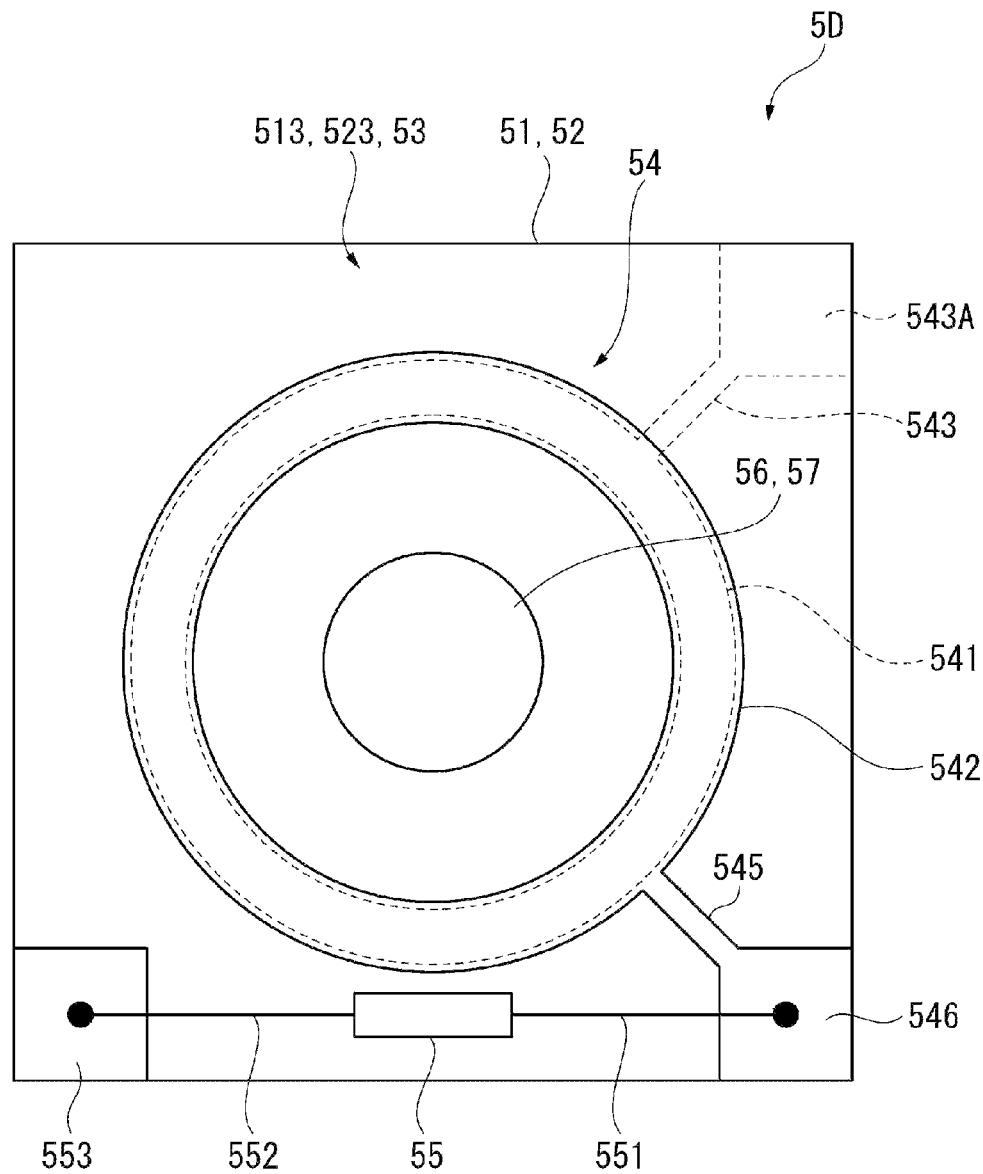
FIG. 10 is a plan view showing a schematic configuration of a tunable interference filter according to a fourth embodiment.

FIG. 10 is a plan view of a tunable interference filter according to the fourth embodiment.

The electrostatic actuator 54 of the tunable interference filter 5D according to the fourth embodiment, as shown in FIG. 10, is configured by one fixed electrode 541 that is disposed on a fixed substrate 51 and one movable electrode 542 that is disposed on a movable substrate 52. In addition, a common electrode line 543 including a common electrode terminal portion 543A is formed so as to extend from the fixed electrode 541, and a driving electrode line 545 including a driving terminal portion 546 is formed so as to extend from the movable electrode 542.

In the tunable interference filter 5D having the above-described configuration, a first sensor wiring 551 of the temperature sensor 55 is connected to the driving terminal portion 546.

On the other hand, a second sensor wiring 552 is connected to a sensor terminal portion 553 that is disposed on the outer circumferential portion of the tunable interference filter 5.

In the filter driving circuit unit 7 of the tunable interference filter 5D, a first driving circuit that connects one driving terminal portion 546 and one driving voltage source (not shown) is disposed, and a second driving circuit in which a first switch is disposed does not need to be arranged. Accordingly, the sensor terminal portion 553 may be directly connected to the temperature detecting circuit.

Even in such a configuration, the first sensor wiring 551 of the temperature sensor 55 is connected to the driving terminal portion 546. Accordingly, the wiring configuration of the tunable interference filter 5D can be formed to be simpler than that of a configuration in which a terminal portion dedicated for the first sensor wiring 551 is arranged or the like.

Other Embodiments

The invention is not limited to the above-described embodiments, and a change, a modification, or the like therein within the scope for achieving the object of the invention is included in an embodiment of the invention.

Figure 11:
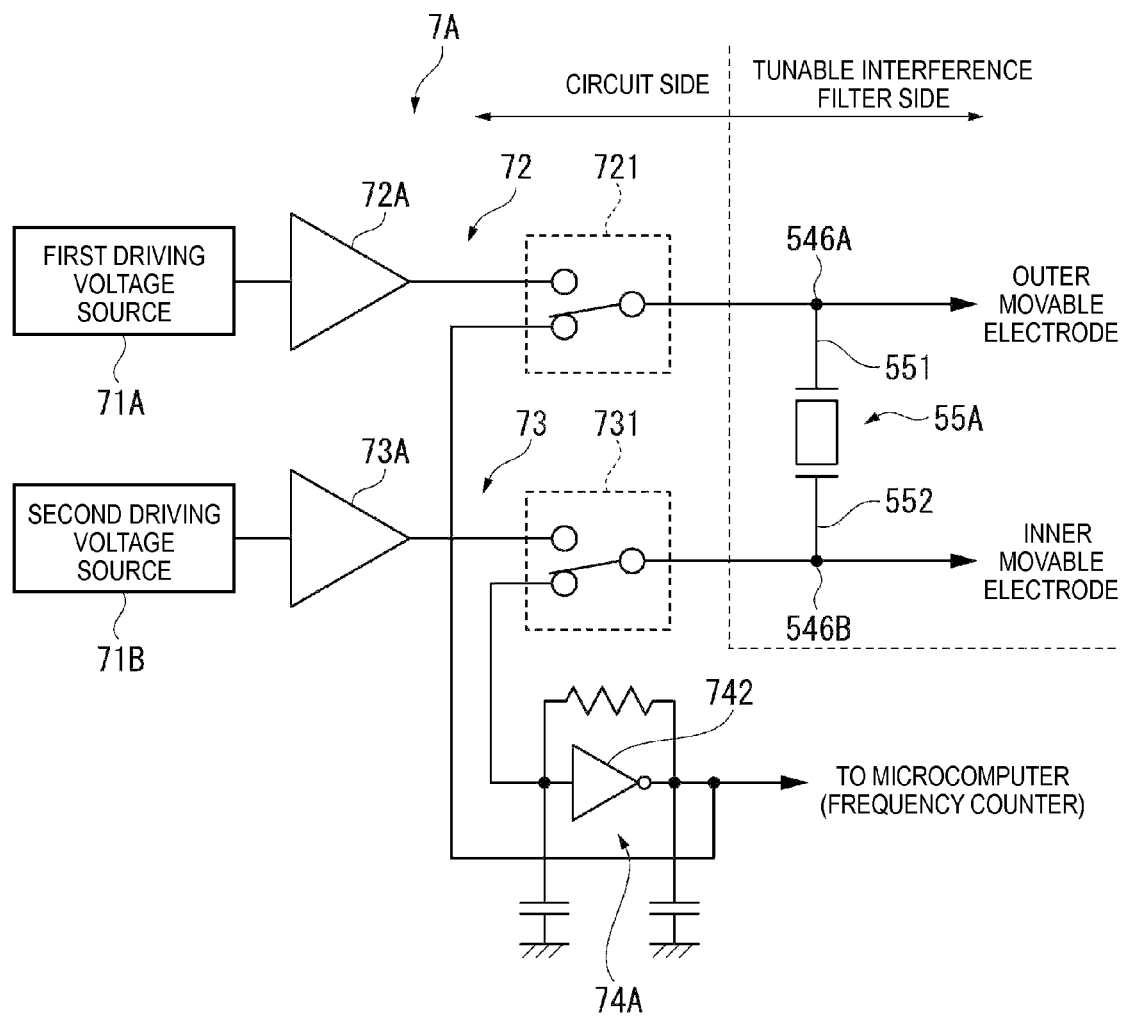
FIG. 11 is a diagram showing a circuit configuration of an optical module according to another embodiment.

For example, in the first to fourth embodiments described above, an example has been represented in which a thermistor or a metal resistance temperature detector of which a resistance value changes in accordance with the temperature is used as the temperature sensor 55. However, the invention is not limited thereto. For example, as shown in FIG. 11, a configuration may be employed in which a temperature sensor 55A detecting the temperature based on a change in the frequency of a quartz oscillator is disposed as the temperature sensor.

In such a case, the temperature detecting circuit 74A of the filter driving circuit unit 7 includes an inverter 742. The temperature detecting circuit 74A converts a current output from the quartz oscillator into an AC voltage signal by using the inverter 742 and outputs the converted signal to the control device 4.

In addition, in the filter driving circuit unit 7A, a third switch 721 is disposed in the first driving circuit 72, and a first switch 731 is disposed in the second driving circuit 73. The third switch 721 can process the first switch 731 through a similar conversion control process. In other words, the third switch 721 is switched under the control of the process switching section 421, and the third switch 721 is in a first connection status in which the first driving voltage source 71A and the outer driving terminal portion 546A are connected through a buffer 72A in the light intensity measuring process and is in a second connection status in which the output side of the inverter 742 and the outer driving terminal portion 546A are connected in the temperature detecting process.

Even in such a configuration, the same operations and advantages as those of the first embodiment can be acquired.

In the above-described embodiments, the electrostatic actuator 54 that bends the holding portion 522 so as to displace the movable portion 521 by applying a voltage between the fixed electrode 541 and the movable electrode 542 has been represented as a gap changing unit as an example. However, the invention is not limited thereto.

For example, a configuration using a dielectric actuator may be employed in which a first dielectric coil is arranged instead of the fixed electrode 541, and a second dielectric coil or a permanent magnet is arranged instead of the second electrode. For example, in the configuration in which the first dielectric coil and the permanent magnet are arranged, a magnetic force is generated by a current flowing through the first dielectric coil, and the movable portion 521 is displaced by an attractive force or a repulsive force that is generated between the generated magnetic force and the permanent magnet. In such a configuration, the first sensor wiring 551 of the temperature sensor 55 may be connected to the driving electrode line used for applying a voltage to the first dielectric coil. In addition, in a case where the first dielectric coil is configured by a plurality of partial dielectric coils, a configuration may be employed in which the first sensor wiring 551 is connected to one of the plurality of partial dielectric coils, and the second sensor wiring 552 is connected to another one.

In the above-described first to fourth embodiments, a configuration is employed in which the movable electrode 542 of the movable substrate 52 is connected to the voltage source 71, and the fixed electrode 541 of the fixed substrate 51 is grounded. However, the invention is not limited thereto. For example, a configuration may be employed in which the movable substrate 52 is used as a first substrate according to the embodiment of the invention, the fixed substrate 51 is used as a second substrate, the fixed electrode 541 is divided into a plurality of partial electrodes insulated from one another as a second electrode according to the embodiment of the invention, and the movable electrode 542 is grounded as a first electrode according to the embodiment of the invention.

In addition, in the above-described embodiments, the holding portion 522 having a diaphragm shape has been described as an example. However, for example, as described above, a configuration may be employed in which a plurality of holding portions having a beam structure is arranged, and the movable portion 521 is held by the holding portions having the beam structure. In such a case, in order to form a uniform bending balance of the holding portions having the beam structure, it is preferable that holding portions having point symmetry with respect to the center axis O are arranged.

In addition, in the above-described first embodiment, the optical measurement device 1 that includes the light source device 2 has been described as an example. However, an optical measurement device that measures the optical characteristics of a light emitting member such as a liquid crystal panel may have a configuration in which the light source device 2 is not arranged.

Furthermore, a specific structure or a specific sequence employed when an embodiment of the invention is performed may be appropriately changed to another structure or the like within the scope in which the object of the invention can be achieved.

The entire disclosure of Japanese Patent Application No. 2010-262186, filed Nov. 25, 2010 is expressly incorporated by reference herein.

What is claimed is:

1. An optical module comprising:
a tunable interference filter including a first substrate, a second substrate that faces the first substrate, a first reflective film that is disposed on the first substrate, a second reflective film that is disposed on the second substrate and faces the first reflective film through a gap, a gap changing unit that changes a size of the gap, and a driving electrode line that is electrically connected to the gap changing unit;
a temperature sensor that detects temperature of the tunable interference filter and has a first sensor wiring and a second sensor wiring; and
a filter driving circuit unit including a driving circuit that is electrically connected to the driving electrode line and a temperature detecting circuit that is electrically connected to the second sensor wiring, to which a temperature detection signal output from the temperature sensor is input,
wherein the first sensor wiring is electrically connected to the driving electrode line.

2. The optical module according to claim 1,
wherein the gap changing unit is an electrostatic actuator that includes a first electrode disposed on the first substrate and a second electrode disposed on the second substrate and faces the first electrode through an inter-electrode gap,
wherein the second electrode includes a first partial electrode and a second partial electrode,
wherein the driving electrode line includes a first driving electrode line that is electrically connected to the first partial electrode and a second driving electrode line that is electrically connected to the second partial electrode,
wherein the first sensor wiring is electrically connected to the first driving electrode line,
wherein the second sensor wiring is electrically connected to the second driving electrode line, and
wherein the filter driving circuit unit includes:
a first driving circuit that connects the first driving voltage source and the first driving electrode line to each other; and
a second driving circuit that has a first switch performing switching between a first switching status in which the second driving voltage source and the second driving electrode line are electrically connected so that a first voltage is applied to the second partial electrode and a second switching status in which the temperature detecting circuit and the second driving electrode line are electrically connected so that the temperature detection signal output from the temperature sensor to which a second voltage is applied by the first driving voltage source is output to the temperature detecting circuit.

3. The optical module according to claim 1,
wherein the temperature sensor is a thermistor or a metal resistance temperature detector of which a resistance value changes in accordance with a change in the temperature.

4. The optical module according to claim 3,
wherein a voltage divider that is grounded through a load resistor is disposed between the temperature sensor and the temperature detecting circuit.

5. The optical module according to claim 4,
wherein the gap changing unit includes a first electrode and a second electrode to which the driving electrode line is electrically connected,
wherein the tunable interference filter includes:
a reference electrode line that is electrically connected to the first electrode; and
a voltage divider that connects the second sensor wiring and the reference electrode line through a load resistor, and
wherein the filter driving circuit unit includes a grounded circuit that grounds the reference electrode line.

6. An optical measurement device comprising:
the optical module according to claim 1; and
a control unit that controls a voltage applied to the gap changing unit,
wherein the control unit includes:
a temperature acquiring section that acquires the temperature detected by the temperature sensor;
a voltage calculating section that calculates the voltage to be applied to the gap changing unit that is necessary for transmitting light of a target wavelength from the tunable interference filter based on the temperature acquired by the temperature acquiring section; and
a voltage control section that applies the voltage calculated by the voltage calculating section to the gap changing unit by controlling the driving circuit.

7. The optical measurement device according to claim 6,
wherein the gap changing unit is an electrostatic actuator that includes a first electrode disposed on the first substrate and a second electrode disposed on the second substrate and faces the first electrode through an inter-electrode gap,
wherein the second electrode includes a first partial electrode and a second partial electrode,
wherein the driving electrode line includes a first driving electrode line that is electrically connected to the first partial electrode and a second driving electrode line that is electrically connected to the second partial electrode,
wherein the first sensor wiring is electrically connected to the first driving electrode line,
wherein the second sensor wiring is electrically connected to the second driving electrode line,
wherein the filter driving circuit unit includes:
a first driving circuit that connects the first driving voltage source; and
a second driving circuit that has a first switch performing switching between a first switching status in which the second driving voltage source and the second driving electrode line are electrically connected so that a first voltage is applied to the second partial electrode and a second switching status in which the temperature detecting circuit and the second driving electrode line are electrically connected so that the temperature detection signal output from the temperature sensor to which a second voltage is applied by the first driving voltage source is output to the temperature detecting circuit, and wherein the control unit includes a process switching section that switches between the first switching status and the second switching status by controlling the first switch.

8. The optical measurement device according to claim 7, wherein the optical module includes a detection unit that receives transmission light transmitted through the tunable interference filter and detects a light intensity of the received light, wherein the filter driving circuit unit includes a second switch that switches between a third switching status in which the detection unit and the control unit are electrically connected and a fourth switching status in which the temperature detecting circuit and the control unit are electrically connected, and wherein the process switching section switches the second switch to the third switching status when the first switch is switched to the first switching status, and the process switching section switches the second switch to the fourth switching status when the first switch is switched to the second switching status.

9. An optical module comprising:

a tunable interference filter including
- a first substrate,
- a second substrate facing the first substrate,
- a first reflective film formed on the first substrate,
- a second reflective film formed on the second substrate and facing the first reflective film,
- a gap changing unit changing a gap between the first reflective film and the second reflective film, and
- a driving electrode line electrically connected to the gap changing unit;

a temperature sensor detecting temperature of the tunable interference filter and including a first sensor wiring and a second sensor wiring, the first sensor wiring being electrically connected to the driving electrode line;

a switch electrically connected to the second sensor wiring; and a temperature detecting circuit electrically connected to the switch.

* * * * *